US011663157B1

(12) United States Patent
Uvieghara et al.

(10) Patent No.: US 11,663,157 B1
(45) Date of Patent: May 30, 2023

(54) JOINT ELECTRON DEVICES ENGINEERING COUNCIL (JESD)204-TO-PERIPHERAL COMPONENT INTERCONNECT EXPRESS (PCIE) INTERFACE

(71) Applicant: IQ-Analog Corporation, San Diego, CA (US)

(72) Inventors: Gregory Uvieghara, Murrieta, CA (US); Michael Kappes, San Diego, CA (US)

(73) Assignee: IQ-Analog Corporation, San Diego, CA (US)

( * ) Notice: Subject to any disclaimer, the term of this patent is extended or adjusted under 35 U.S.C. 154(b) by 0 days.

(21) Appl. No.: 18/086,773

(22) Filed: Dec. 22, 2022

(51) Int. Cl.
*G06F 13/42* (2006.01)
*G06F 13/38* (2006.01)

(52) U.S. Cl.
CPC ........ *G06F 13/4291* (2013.01); *G06F 13/387* (2013.01); *G06F 2213/0026* (2013.01)

(58) Field of Classification Search
CPC ............... G06F 13/4291; G06F 13/387; G06F 2213/0026
See application file for complete search history.

(56) References Cited

U.S. PATENT DOCUMENTS

| | | | | |
|---|---|---|---|---|
| 9,210,010 | B2 * | 12/2015 | Whitby-Strevens | ... G09G 5/006 |
| 10,261,924 | B2 * | 4/2019 | Nautiyal | ............ G06F 13/4286 |
| 2019/0205278 | A1 * | 7/2019 | Panian | ................ G06F 12/1081 |
| 2022/0366992 | A1 * | 11/2022 | Roethig | ............... G11C 7/1084 |

FOREIGN PATENT DOCUMENTS

| | | | |
|---|---|---|---|
| CN | 216016848 U | * 3/2022 | |
| WO | WO-2019165954 A1 | * 9/2019 | ........... G06F 13/385 |

OTHER PUBLICATIONS

Harris, Jonathan; "What is JESD204 and Why We Should Pay Attention to It?"; Electronic Design; Accessed Feb. 28, 2023 at <URL: https://www.electronicdesign.com/technologies/analog/article/21127816/analog-devices-what-is-jesd204-and-why-we-should-pay-attention-to-it>; Apr. 3, 2020. (Year: 2020).*

(Continued)

*Primary Examiner* — Glenn A. Auve
(74) *Attorney, Agent, or Firm* — Law Office of Gerald Maliszewski; Gerald Maliszewski

(57) ABSTRACT

A system and method are provided for interfacing JESD204-to-PCIe communications. The method transceives JESD204 link layer messages with a JESD204 link layer. The method converts between JESD204 link layer messages and PCIe scrambled messages. The method converts between PCIe scrambled messages and PCIe encoded messages. The PCIe encoded messages are transceived at a JESD clock rate. The PCIe encoded messages transceived at the JESD clock rate are buffered and PCIe encoded messages are then transceived at a PCIe clock rate. The PCIe encoded messages at the PCIe clock rate are transceived with a PCIe physical layer. That is, PCIe encoded messages are either transmitted to the PCIe physical layer at the PCIe clock rate (the transmission path), or received from the PCIe physical layer (at the PCIe clock rate) and buffered (the receive path). The system and method also enable conventional JESD link layer-to-JESD physical layer communications.

26 Claims, 10 Drawing Sheets

(56) References Cited

OTHER PUBLICATIONS

Harris, Jonathan; "Understanding Layers in the JESD204B Specification—A High Speed ADC Perspective"; Analog Devices Technical Article MS-2714; Analog Device 2017. (Year: 2017).*
Machine translation of WO 219165954 A1 (Year: 2019).*
Machine translation of CN 216016848 U (Year: 2022).*

* cited by examiner

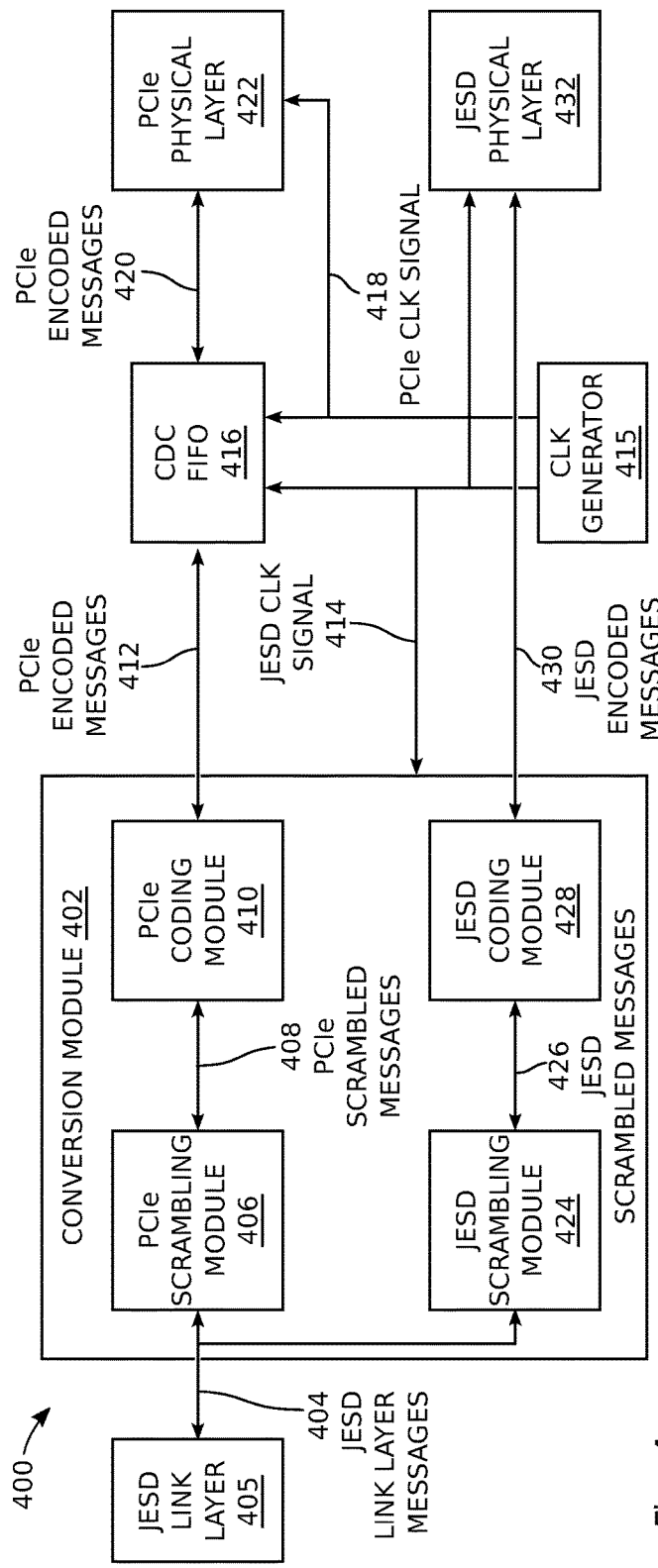
Fig. 4
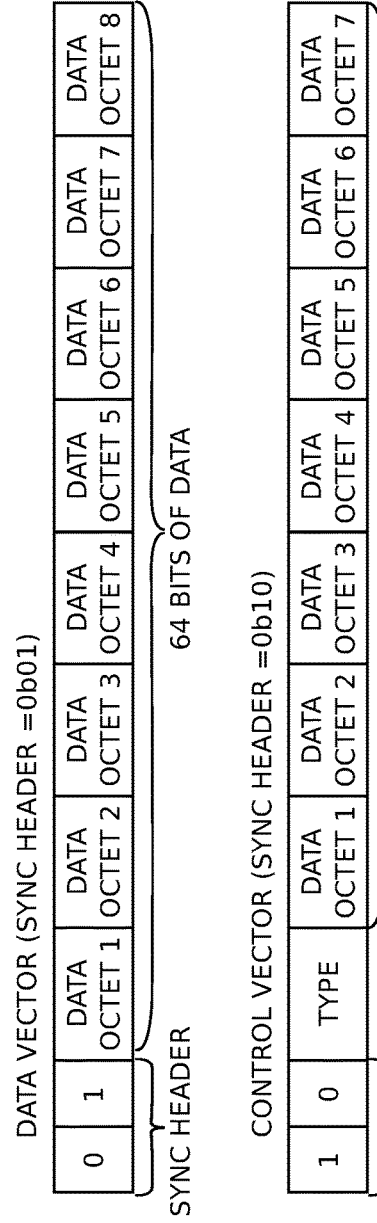
Fig. 10A
Fig. 10B

CASE 1: TRANSMIT

CASE 2: RECEIVE

CASE 1: TRANSMIT

CASE 2: RECEIVE

JOINT ELECTRON DEVICES ENGINEERING COUNCIL (JESD)204-TO-PERIPHERAL COMPONENT INTERCONNECT EXPRESS (PCIE) INTERFACE

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to digital communications and, more particularly, to a system and method for efficiently converting between Joint Electron Devices Engineering Council (JESD)204 and Peripheral Component Interconnect Express (PCIe) data streams.

2. Description of the Related Art

With the expectation of billions of internet-connected devices and data-intensive real-time applications, the response times and high bandwidth requirements of 5G and IoT (Internet of Things) demand faster networking speeds, which in turn, require faster memory and faster serial bus communications like PCIe. PCIe is a high-speed, differential, serial communication standard for point-to-point communications, in a data center for example. PCIe interconnect technology is the basis of development for many data center technologies such as DDR (Double Data Rate) storage and graphics processing units (GPUs). Answering the need to respond more quickly to rapidly escalating demands of new data-intensive applications that include servers, cloud computing, IoT, artificial intelligence, and 5G wireless, the PCIe data rate has been doubling every three years from one generation to the next. Correspondingly, the data rates of analog-to-digital converters (ADCs) and digital-to-analog converters (DACs) have also been increasing from one generation to the next.

While PCIe is the serial communication standard used in data centers and to drive GPUs, JESD204 is, conventionally, the serial communication standard used to interface ADCs and DACs to the external world. When ADCs and DACs have to interface with GPUs, DDRs, and Solid State Drives (SSDs), the ADCs and DACs use JESD204 while the GPUs, DDRs, and SSDs use PCIe. Therefore, the inherent mismatch between JESD204 (used by the ADCs & DACs) and PCIe (used by the GPUs, DDRs & SSDs) has to be resolved. JESD204 and PCIe interfaces cannot be directly connected together because JESD204 and PCIe have different physical layers, different encoding (decoding), different scrambling (descrambling), and modulation (demodulation) schemes. The problem to be solved is how to connect the JESD204 and PCIe interfaces seamlessly and synchronously in an efficient, inexpensive, non-kludgy, and fast way, despite the vast differences between both interfaces.

FIG. 1 is a schematic block diagram depicting a conventional approach that resolves JESD204/PCIe mismatch by using slow and expensive glue logic that employs Field Programmable Gate Arrays (FPGAs) (prior art). This approach obviates the need for synchronizing both interfaces by using a FPGA and a memory element (e.g. Static Random Access Memory (SRAM)) to decouple the interfaces, as depicted. The disadvantages of this approach are the extra complexity and extra BOM (bill of materials) cost due to the extra memory and extra connections. In addition, this approach suffers from lower speed due to the latency of the FPGA-memory data traffic.

It would be advantageous if there existed a seamless and efficient approach to link JESD204 interfaces (connected to ADCs and DACS) to PCIe interfaces (connected to the GPUs, DDRs, SSDs) to satisfy the ever increasing demand for faster response times and high bandwidth requirements of new data-intensive applications (e.g. servers, cloud computing, IoT, artificial intelligence, and 5G wireless).

SUMMARY OF THE INVENTION

Described herein is a means to seamlessly and synchronously connect a system (e.g. with Analog-to-Digital Converters (ADCs) and Digital-to-Analog Converters (DACs)) which drives (receives from) a Joint Electron Devices Engineering Council (JESD)204 serial interface on one chip with a Peripheral Component Interconnect Express (PCIe) interface driving (receiving from) another system (e.g. with Graphics Processing Unit (GPU), Double Data Rate (DDR) Memory, or Solid-State Drive (SSD)).

Accordingly, a method is provided for interfacing JESD204-to-PCIe communications. The method transceives JESD204 link layer messages with a JESD204 link layer. As used herein, "transceiving" is understood to be either (or both) transmitting or receiving. The method converts between JESD204 link layer messages and PCIe scrambled messages. That is, the method either converts a received JESD204 link layer message to a PCIe scrambled message (i.e., the transmission path), or descrambles a PCIe scrambled message to create a JESD204 link layer message (i.e., the receive path). The method converts between PCIe scrambled messages and PCIe encoded messages. That is, the method either converts a PCIe scrambled message to a PCIe encoded message (the transmission path), or converts a PCIe encoded message to a PCIe scrambled message (the receive path). The PCIe encoded messages are transceived at a JESD clock rate. The PCIe encoded messages transceived at the JESD clock rate are buffered and PCIe encoded messages are then transceived at a PCIe clock rate. The PCIe encoded messages are transceived with a PCIe physical layer at the PCIe clock rate. That is, PCIe encoded messages are either transmitted to the PCIe physical layer at the PCIe clock rate (the transmission path), or received from the PCIe physical layer (at the PCIe clock rate) for buffering (the receive path).

In one aspect, the method converts between 64 bit (b) JESD204C link layer messages and version 3.0, 4.0, 5.0, or 6.0 PCIe scrambled messages and transceives 128b/130b PCIe encoded messages. In the case of version 3.0, 4.0, and 5.0 PCIe, the JESD clock rate is the same as the PCIe clock rate. In the case of PCIe 6.0, the JESD clock signal has a first clock rate and the PCIe clock signal has a second clock rate equal to a second clock bit rate and equal to half the first clock rate. The result is that the PCIe physical layer transceives PCIe encoded messages at a baud rate equal to half the second clock bit rate.

In another aspect, the method converts between 8b JESD204B link layer messages and version 1.0 or 2.0 PCIe scrambled messages and transceives 8b/10b PCIe encoded messages, with the JESD and PCIe clock signals having the same clock rate.

In one aspect the method includes additional or alternative steps. In this aspect the method converts between JESD204 link layer messages and JESD scrambled messages, converts between JESD scrambled messages and JESD encoded messages, and transceives JESD encoded messages at the JESD clock rate, with a JESD physical layer. In the case of 64b JESD204C link layer messages, 66b JESD204C encoded messages are transceived with the JESD physical layer. In the case of 8b JESD204B link layer messages, 10b JESD204B encoded messages are transceived with a JESD physical layer.

Additional details of the above-described method, and a JESD204-to-PCIe interface system are presented below.

BRIEF DESCRIPTION OF THE DRAWINGS

FIG. 4 is a schematic block diagram of a JESD204-to-PCIe interface system.

FIGS. 10A and 10B are drawings depicting exemplary 66b words with SYNC HEADERs.

DETAILED DESCRIPTION

Definitions

Figure 1:
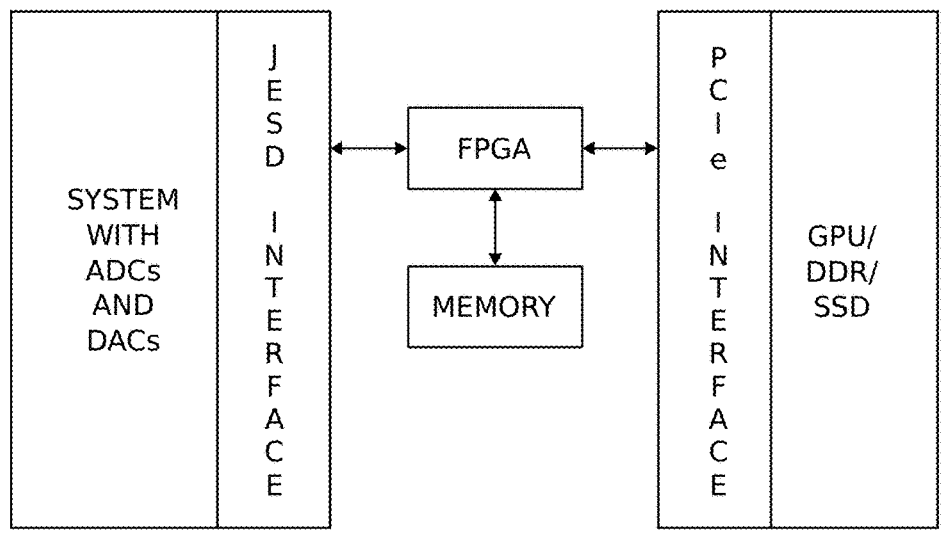
FIG. 1 is a schematic block diagram depicting a conventional approach that resolves JESD204/PCIe mismatch by using slow and expensive glue logic that employs Field Programmable Gate Arrays (FPGAs) (prior art).

5G: In telecommunications, 5G stands for the 5th-generation technology standard for broadband cellular networks, which cellphone companies began deploying in 2019. 5G is the planned successor to the 4G (4th-generation) networks which provide connectivity to most current cellphones.

IoT: The Internet of Things (IoT) describes groups of physical objects with sensors, processing ability, software, and other technologies that connect and exchange information with other devices and systems over the Internet or other communication networks. The IoT field has rapidly evolved due to the convergence of multiple technologies, including ubiquitous computing, inexpensive commodity sensors, increasingly powerful embedded systems, and machine learning. The conventional fields of embedded systems, wireless sensor networks, control systems, automation (e.g. home and building automation), independently and collectively enable the Internet of Things. In the consumer market, IoT technology is often synonymous with products that pertain to the concept of the "smart home", including appliances (e.g. lighting fixtures, thermostats, home security systems, cameras, swimming pool devices) that can be controlled by smart phones and smart speakers.

JEDEC: The JEDEC (Joint Electron Device Engineering Council) Solid State Technology Association is an independent semiconductor engineering trade organization and standardization body.

JESD204: (JEdec StandarD2041) JESD204 is a JEDEC standardized serial interface used by data converters (ADCs and DACs) and logic devices (FPGAs or Application-Specific Integrated Circuits (ASICs)). This interface was developed by the JEDEC JESD204 standards committee to reduce the number of data inputs/outputs between high-speed data converters (ADCs and DACs) and logic devices (FPGAs or ASICs). Other advantages of this interface include a reduced Printed Circuit Board (PCB)/package area and a simplified interface timing.

JESD LAYERS & INTERFACE:

a. JESD TRANSPORT LAYER: The transport layer is responsible for data framing and de-framing.

b. JESD LINK LAYER: The link layer is responsible for the JESD protocol handling, including scrambling/descrambling, lane alignment, character replacement, and alignment monitoring. The JESD link layer employs parallel data streams.

c. JESD PHYSICAL LAYER: The physical layer peripherals are responsible for interfacing, configuring, driving (receiving from) the high-speed differential serial transceivers.

i. On the transmit side, the physical layer consists of a parallel-to-serial converter, a pulse-shaping/emphasis block and a differential driver.

ii. On the receiver side, the physical layer consists of a differential receiver, an equalizer block, a clock/data recovery (CDR) block, and a serial-to-parallel converter.

d. JESD INTERFACE: A system with ADC's/DAC's communicates with the external world through the JESD Interface, which consists of the JESD Transport, Link, and Physical Layers.

ADC (Analog-to-Digital Converter): In electronics, an analog-to-digital converter (ADC, A/D, or A-to-D) is a system that converts an analog signal, (such as a radio frequency (RF) signal entering a chip, a sound picked up by a microphone, or light entering a digital camera), to a digital signal.

DAC (Digital-to-Analog Converter): A DAC performs the reverse function of an ADC. In electronics, a digital-to-analog converter (DAC, D/A, or D-to-A) is a system that converts a digital signal to an analog signal.

PCIe (PCI Express): PCI Express (Peripheral Component Interconnect Express), officially abbreviated as PCIe or PCI-e, is a high-speed serial computer expansion bus standard, designed to replace the older PCI, PCI-X and AGP bus standards. It is the common motherboard interface for personal computer graphics cards, HDD (hard disk drive) host adapters, SSDs (Solid-State Drives), Wi-Fi, and Ethernet hardware connections.

GRAPHICS PROCESSING UNIT (GPU): A graphics processing unit is a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing. Their highly parallel structure makes them more efficient than general-purpose central processing units (CPUs) for algorithms that process large blocks of data in parallel. In a personal computer, a GPU can be present on a video card or embedded on the motherboard. In certain CPUs, they are embedded on the CPU die.

DOUBLE DATA RATE (DDR) MEMORY: Double Data Rate Synchronous Dynamic Random-Access Memory (DDR SDRAM) transfers data with both the rising and falling edges of the clock in order to double the data bus bandwidth without doubling the clock frequency. The name "double data rate" (DDR) refers to the fact that, by using both clock edges, for a certain clock frequency, DDR SDRAM achieves nearly twice the bandwidth of a SDR (single data rate) SDRAM running at the same clock frequency.

SOLID-STATE DRIVE (SSD): A solid-state drive (SSD) is a solid-state storage device that uses integrated circuit assemblies to store data persistently. This can be achieved by using flash memory, and functioning as secondary storage in the computer storage hierarchy. Compared with electromechanical drives, SSDs are typically more resistant to physical shock, can run silently, and have higher data rates, better response times and lower latency. SSDs can use high speed interfaces over PCIe to increase performance over HDD (hard disk drive) performance.

Figure 2:
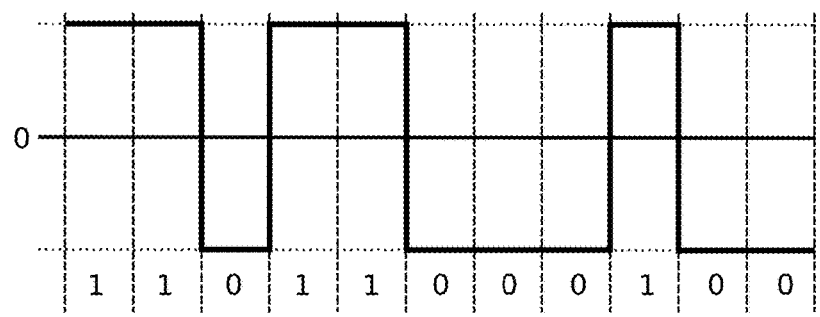
FIG. 2 is a diagram of a Non-Return-to-Zero (NRZ) waveform (prior art).

NRZ:

FIG. 2 is a diagram of a Non-Return-to-Zero (NRZ) waveform (prior art). NRZ is also known as Pulse Amplitude Modulation 2 (PAM2), is a binary code that uses low (high) signal level to represent the 0(1) information of a digital logic signal. NRZ can only transmit 1 bit (0 or 1) of information every signal symbol period. It is called Non-Return-to-Zero because 1's (0's) are represented by positive (negative) voltage and there is no ZERO (neutral or rest) condition.

Figure 3:
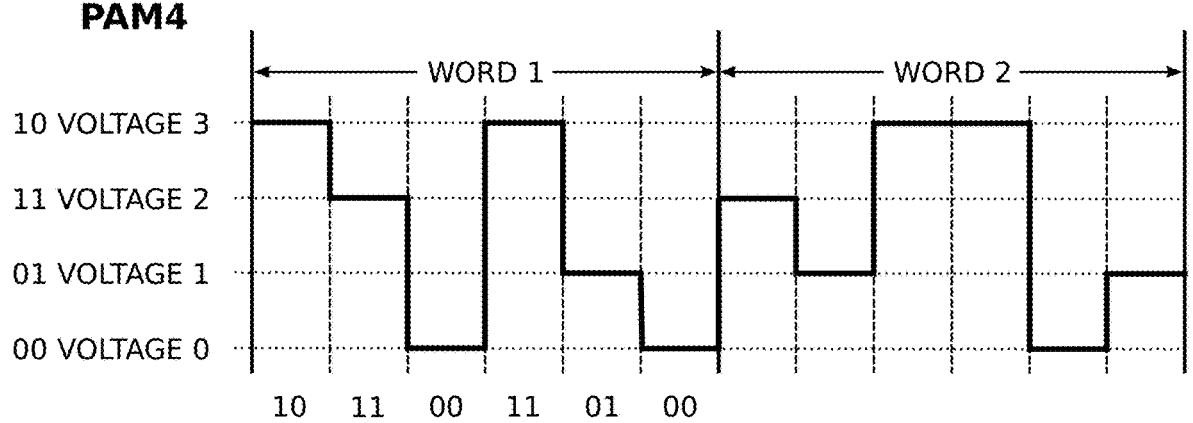
FIG. 3 is a diagram of a Pulse Amplitude Modulation 4 (PAM4) waveform (prior art).

PAM4:

FIG. 3 is a diagram of a Pulse Amplitude Modulation 4 (PAM4) waveform (prior art). PAM4 is a multi-level modulation format for transmitting data, where each signal level represents 2 bits of digital logic information. PAM4 has twice the data rate of NRZ since PAM4 transmits 2 bits of information per clock cycle, while NRZ transmits 1 bit of information per clock cycle.

FIG. 4 is a schematic block diagram of a JESD204-to-PCIe interface system. The system 400 comprises a conversion module 402 comprising a link layer interface on line 404 to transceive JESD204 link layer messages with a JESD204 link layer 405. The term "transceive" is defined herein to be either transmit or receive, meaning that JESD204 link layer message may move in either direction on line 404. Additional details are provided below. A PCIe scrambling module 406 converts between JESD204 link layer messages on line 404 and PCIe scrambled messages on line 408. PCIe scrambling module 406 may be understood to be a scrambling/descrambling module, as it may receive JESD link layer messages on line 404 and supply PCIe scrambled messages on line 408. Alternatively, the PCIe scrambling module may act to descramble PCIe scrambled messages received on line 408 to supply JESD link layer messages on line 404.

A PCIe coding module 410 converts between PCIe scrambled messages on line 408 and PCIe encoded messages on line 412. Alternatively, the PCIe coding module may be understood to be encoding/decoding module, as it may receive PCIe scrambled messages on line 408 and supply PCIe encoded messages on a clock-domain-crossing (CDC) interface on line 412. Alternatively, the PCIe coding module 410 may receive PCIe encoded messages on line 412, decode the PCIe encoded messages, and supply the result (PCIe scrambled messages) on line 408. The CDC interface transceives PCIe encoded messages at a JESD clock rate. The PCIe scrambling module 406 and PCIe coding module 410 also operate at the JESD clock rate. A JESD clock (CLK) interface on line 414 supplies a JESD clock signal from clock generator 415.

A CDC first-in first-out (FIFO) memory 416 comprises a JESD clock input to accept the JESD clock signal on line 414. A PCIe clock input on line 418 accepts a PCIe clock signal having a PCIe clock rate. The CDC FIFO 416 transceives PCIe encoded messages with the PCIe coding module via the CDC interface on line 412 at the JESD clock rate, and has a PCIe physical layer interface on line 420 to transceive PCIe encoded messages at the PCIe clock rate with a PCIe physical layer 422. Although the memory 416 is primarily described herein as a FIFO memory, more generally the memory may potentially be enabled as other types of memory as would be known by one with skill in the art.

In one aspect the PCIe scrambling module converts between 64 bit (b) JESD204C link layer messages and 3.0, 4.0, 5.0, or 6.0 PCIe scrambled messages, in which case the conversion module CDC interface on line 412 transceives 128b/130b PCIe encoded messages. As explained in greater detail below, the PCIe scrambling module 406 converts between JESD204C link layer messages and PCIe scrambled messages using the following polynomial:

$$X^{23}+X^{21}+X^{16}+X^{8}+X^{5}+X^{2}+1.$$

In the case of PCIe versions 3.0, 4.0, or 5.0, the JESD clock signal on line 414 has a first clock rate and the PCIe clock signal on line 418 also has the first clock rate. In some circumstances when the JESD clock signal is synchronized (in phase) with the PCIe clock signal, the CDC FIFO 416 may be unnecessary and can be bypassed. In the case of PCIe version 6.0, the JESD clock signal on line 414 has a first clock rate, the PCIe clock signal on line 418 has a second clock rate equal to a second clock bit rate and equal to half the first clock rate. The PCIe physical layer interface on line 420 transceives PCIe encoded messages at a baud rate equal to half the second clock bit rate.

In the case of PCIe versions 1.0 or 2.0 the PCIe scrambling module 406 converts between 8b JESD204B link layer messages and PCIe scrambled messages, and the conversion module CDC interface on line 412 transceives 8b/10b PCIe encoded messages. The PCIe scrambling module 406 converts between JESD204B link layer messages and PCIe scrambled messages using the following polynomial:

$$X^{16}+X^{5}+X^{4}+X^{3}+1.$$

As with PCIe versions 3.0, 4.0, or 5.0 the JESD clock signal on line 414 has a first clock rate and the PCIe clock signal on line 418 has the first clock rate. Again, there may be some circumstances, when the JESD clock signal is synchronized (in phase) with the PCIe clock signal, that the CDC FIFO 416 is unnecessary and can be bypassed.

When encoding, the PCIe coding module 410 acts as a "gearbox" to convert incoming 64 bit data width (64 bits per cycle) messages to outgoing 128 bit data width (128 bits per 2 cycles) messages. An alternating or "ping-pong" function generates odd-cycle and even-cycle signals (each is an inversion of the other) that are high in alternate cycles. When the odd-cycle (even-cycle) is high, the 64 bit odd-word (even-word) is loaded into a gearbox register. Therefore, every 2 cycles a 2-bit SYNC HEADER is appended to the 128-bit output of the gearbox register, to form a message of 130 bits per 2 cycles. When decoding, the gearbox converts incoming 128 bit data width (128 bits per 2 cycles) messages to 64 bit data width (64 bits per cycle) messages. In the odd-cycle the 2-bit SYNC HEADER and the 64-bit word are loaded into the gearbox register. The odd-cycle=high (low) selects the odd-word (even-word) in an output multiplexor. Therefore, every cycle the gearbox alternatively drives the output with a 64-bit odd-word or a 64-bit even-word, after stripping off the 2-bit SYNC HEADER. Consequently, 130 bits per 2 cycles enter when decoding, and 64 bits leave per cycle.

Optionally, the system conversion module 402 may further comprise a JESD scrambling module 424 to convert between JESD204 link layer messages on line 404 and JESD scrambled messages on line 426. A JESD coding module 428 converts between JESD scrambled messages on line 426 and JESD encoded messages on line 430. A JESD physical layer interface on line 430 transceives the JESD encoded messages at the JESD clock rate, with a JESD physical layer 432. The JESD scrambling module 424 and JESD coding module 428 may operate in parallel (simultaneously) with the PCIe scrambling module 406 and PCIe coding module 410, or as an alternative to the PCIe scrambling and coding modules being enabled.

As is conventional, when the JESD scrambling module 424 converts between 64b JESD204C link layer messages and JESD scrambled messages, the conversion module JESD physical layer interface on line 430 transceives 66b JESD204C encoded messages. In this case, the JESD scrambling module 424 converts between 64b JESD204C link layer messages and JESD scrambled messages using the following polynomial:

$$X^{58}+X^{39}+1.$$

Alternatively, when the JESD scrambling module 424 converts between 8b JESD204B link layer messages and JESD scrambled messages, the conversion module JESD physical layer interface on line 430 transceives 10b JESD204B encoded messages. In this case, the JESD scrambling module 424 converts between 8b JESD204B link layer messages and JESD scrambled messages using the following polynomial:

$$X^{15}+X^{14}+1.$$

Figure 5A:
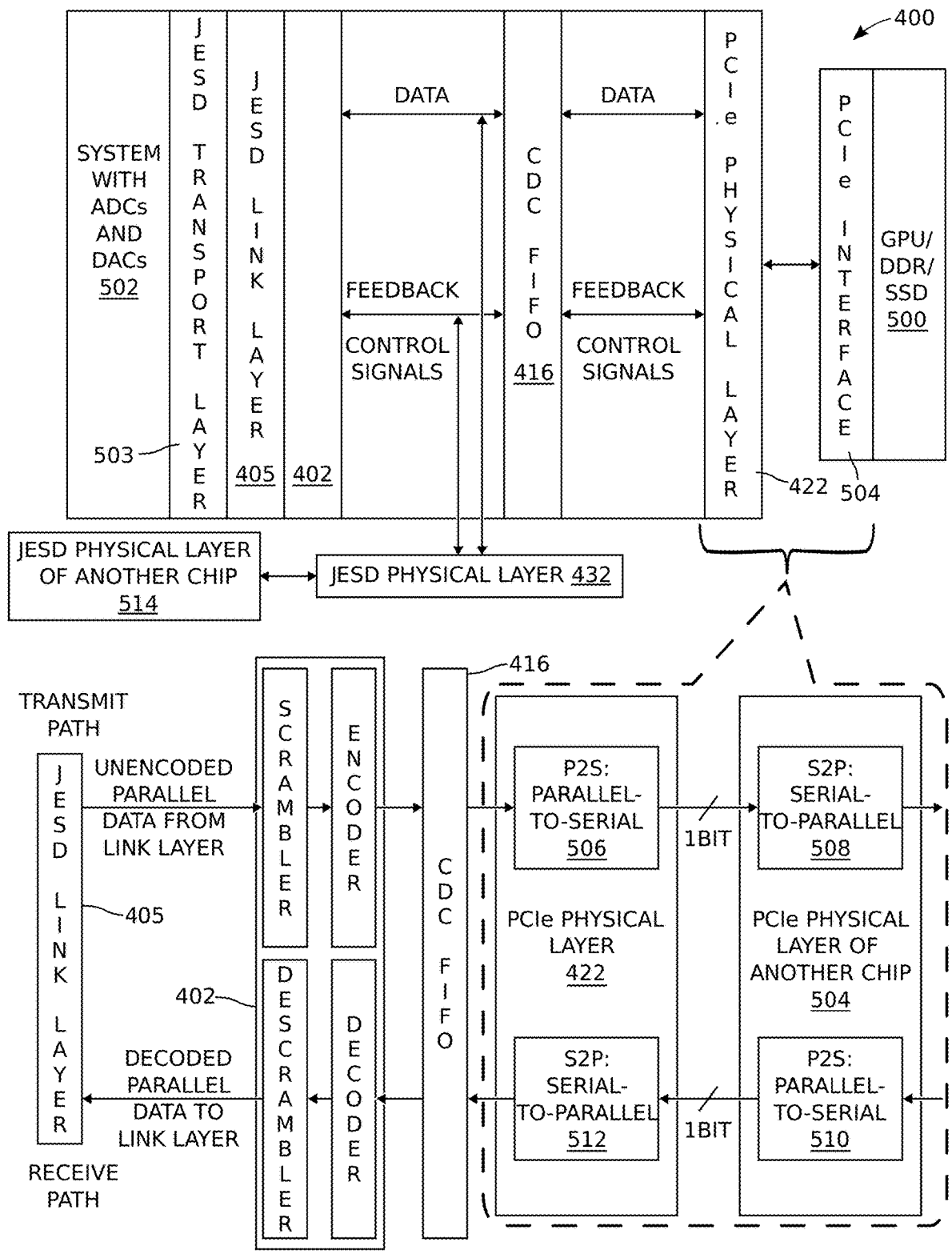
FIGS. 5A and 5B are schematic block diagrams depicting the system of FIG. 4 in greater detail.
Figure 5B:
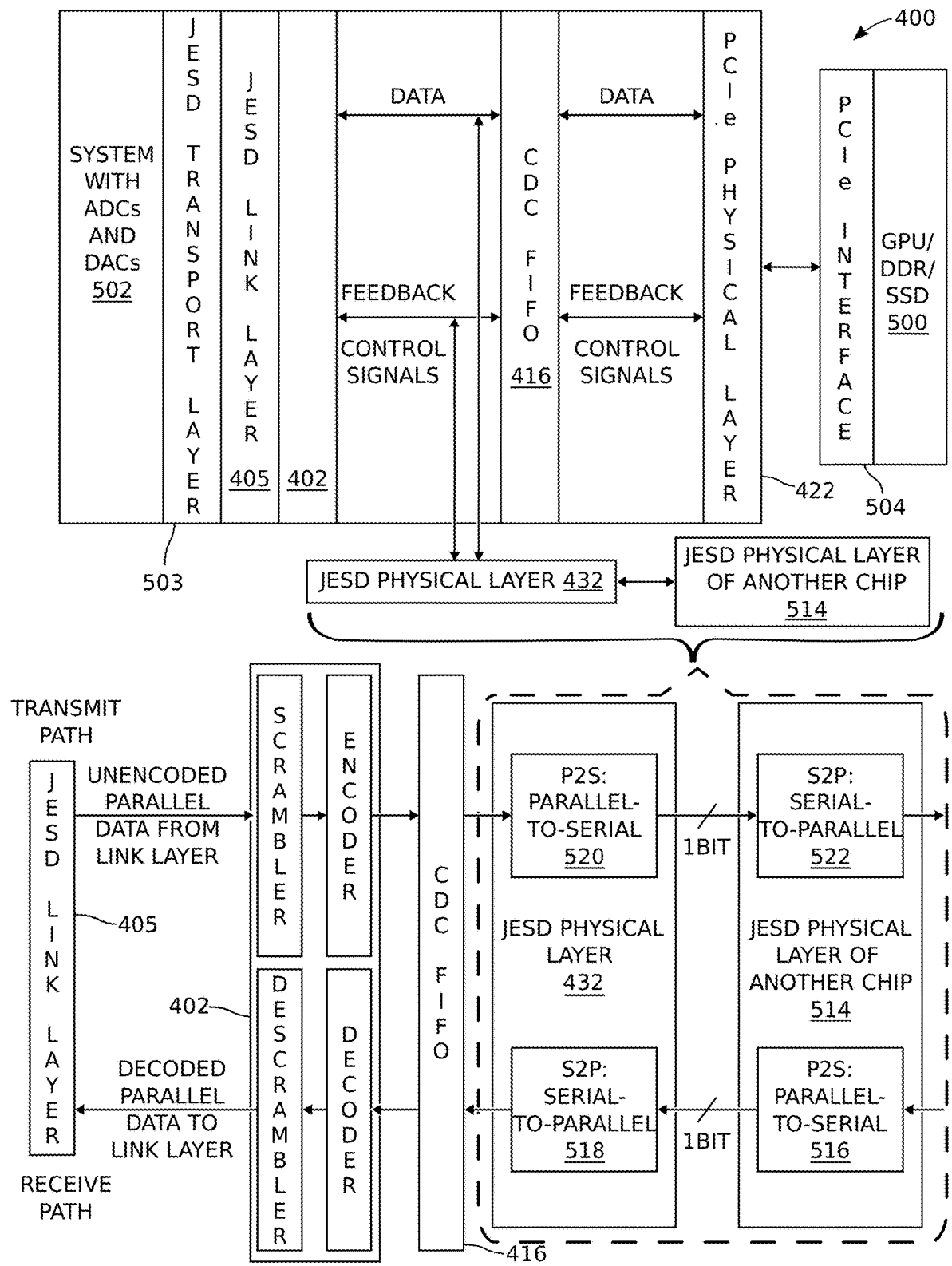

FIGS. 5A and 5B are schematic block diagrams depicting the system of FIG. 4 in greater detail. As noted above, the encoding (decoding) and scrambler (descrambler) differences between JESD and PCIe cannot be resolved in the JESD physical layer 432. Therefore, conversion module 402 is used to modify the encoding (decoding) and scrambling (descrambling) of the output of the JESD link layer 405, transceived from devices 502 via the JESD transport layer 503, before the PCIe physical layer 422 is used to drive (receive from) external devices 504, and JESD physical layer 432 is used to drive (receive from) the external devices 514.

The off-chip link between PCIe physical layer 422 and the PCIe physical layer of another chip is always serial, according to the PCIe Standard. Therefore, in FIG. 5A, any parallel data that enters the PCIe physical layer 422 is first converted with a P2S (parallel-to-serial) block 506 to a serial single-bit stream before it is transmitted off-chip. At the receiving end, the serial data is converted back to parallel data by a S2P (serial-to-parallel) block 508 in the physical layer 504 of the receiving chip.

In the PCIe receive path (FIG. 5A) encoded serial data from the sending chip's physical layer 504, from P2S 510, is converted by S2P 512 in PCIe physical layer 422 to encoded parallel data. The encoded parallel data is sent through the CDC_FIFO 416 to a decoder and descrambler in the conversion module 402, and then to the JESD link layer 405. In other words, all the data used in system 400 is parallel data and all data sent between chips is serial data.

Likewise in FIG. 5B, the off-chip link between JESD physical layer 432 and the JESD physical layer 514 of another chip is always serial. Therefore, any parallel data that enters JESD physical layer 514 is first converted with a P2S block 516 to a serial single-bit stream before it is transmitted off-chip. At the receiving end, the serial data is converted back to parallel data by a S2P block 518 in the JESD physical layer 432. In the JESD transmit path encoded serial data from P2S 520 of the JESD physical layer 432 is converted by S2P 522 in off-chip physical layer 514 to encoded parallel data.

Minimizing the number of chip pins is one of the reasons that data is serialized. For example, for a 24-lane chip with 66 bits/lane without serialization, the number of pins would be 24×66=1,584! With serialization, the number of pins is 24 (1 per lane). Another advantage of serialization is that instead of routing 1,584 wires on the board off-chip, only 24 wires need be routed. This saves a lot of cost and board area. Yet another advantage of serialization is that 66 bits need not be de-skewed and aligned per lane, since all the 66 bits are reduced to just 1 bit/lane by the P2S block.

Another advantage of the above-described system is improved latency, as compared to the prior art system depicted in FIG. 1. The system 400 described in FIGS. 4, 5A, and 5B has a maximum latency of one clock cycle, which may occur in the CDC FIFO as a result of phase differences between different clock domains. The system of FIG. 1 can potentially have a latency of 15 clock cycles, as the transfer of data between the memories of different chips is known to result in a delay of several processor cycles.

Table 1 is useful in correlating the relationship between JESD signals and PCIe signals in the conversion module, as described in the following figures. Table 2 is useful in correlating the relationship between JESD signals and PCIe signal in the CDC FIFO as described in the following figures.

TABLE 1

SCRAMBLERS (DESCRAMBLERS) AND ENCODERS (DECODERS)

| CASE | JESD VERSION | PCIe VERSION |
|---|---|---|
| 1 | 204C | 3.0, 4.0, 5.0, 6.0 |
| 1.1 | TRANSMIT JESD204C TO PCIe 3.0, 4.0, 5.0, 6.0 | |
| 1.2 | RECEIVE JESD204C FROM PCIe 3.0, 4.0, 5.0, 6.0 | |
| 2 | 204B | 1.0 & 2.0 |
| 2.1 | TRANSMIT JESD204B TO PCIe 1.0 & 2.0 | |
| 2.2 | RECEIVE JESD204B FROM PCIe 1.0 & 2.0 | |

TABLE 2

CDC FIFO

| CASE | JESD VERSION | PCIe VERSION |
|---|---|---|
| | 204B & 204C | 1.0, 2.0, 3.0, 4.0, 5.0 |
| 1 | TRANSMIT JESD204B & JESD204C TO PCIe 1.0, 2.0, 3.0, 4.0, 5.0 | |
| 2 | RECEIVE JESD204B & JESD204C FROM PCIe 1.0, 2.0, 3.0, 4.0, 5.0 | |

TABLE 2-continued

CDC FIFO

| CASE | JESD VERSION | PCIe VERSION |
|---|---|---|
| | 204C | 6.0 |
| 1 | TRANSMIT JESD204C TO PCIe 6.0 | |
| 2 | RECEIVE JESD204C FROM PCIe 6.0 | |

Figure 6A:
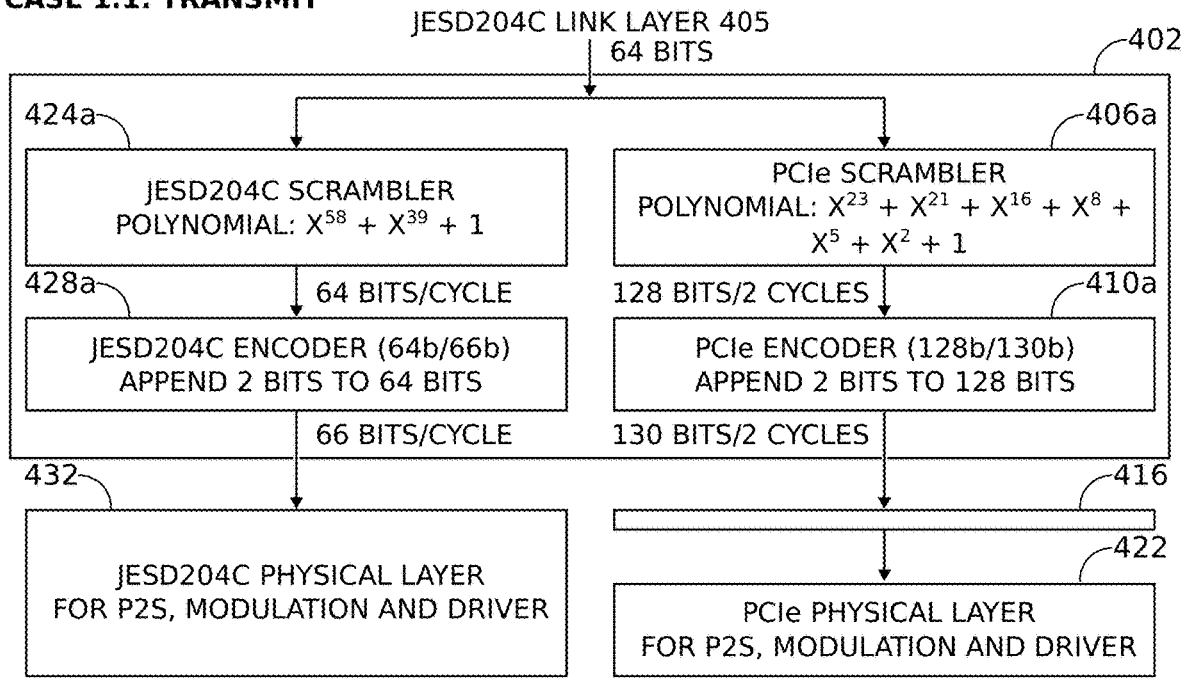
FIGS. 6A and 6B are schematic block diagrams depicting the conversion module in greater detail, with Cases 1, 1.1, and 1.2 as noted in Tables 1 and 2.
Figure 6A:
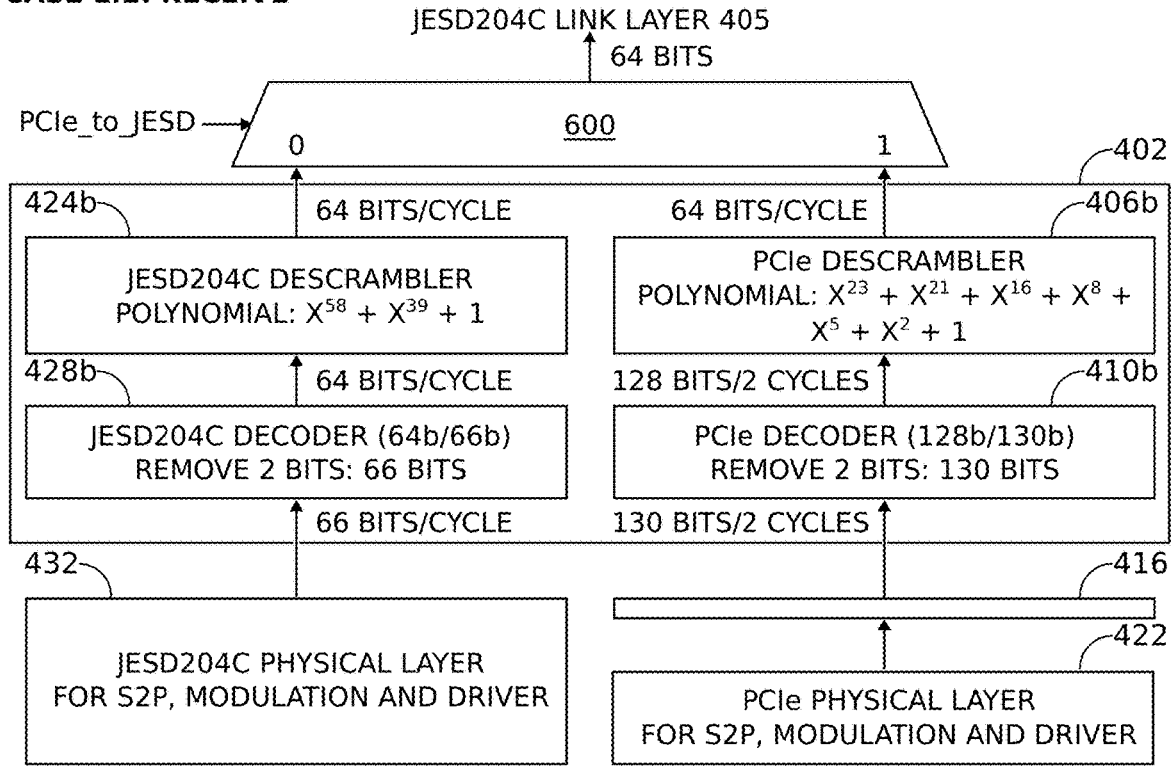
Figure 6B:
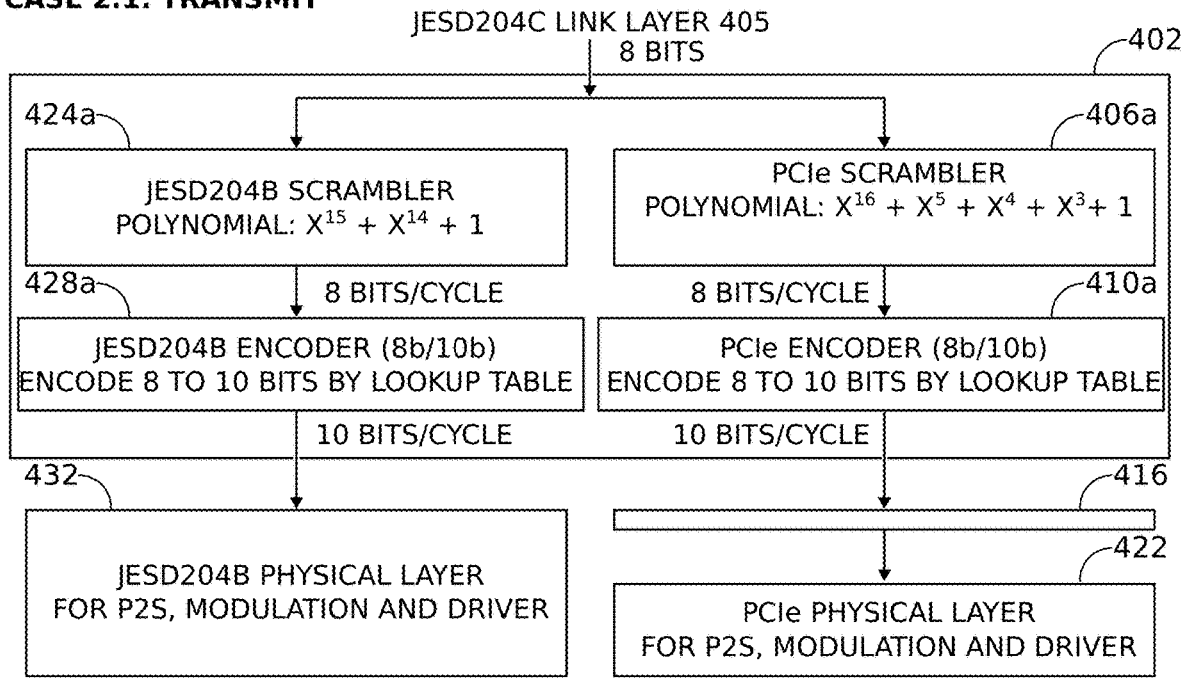
Figure 6B:
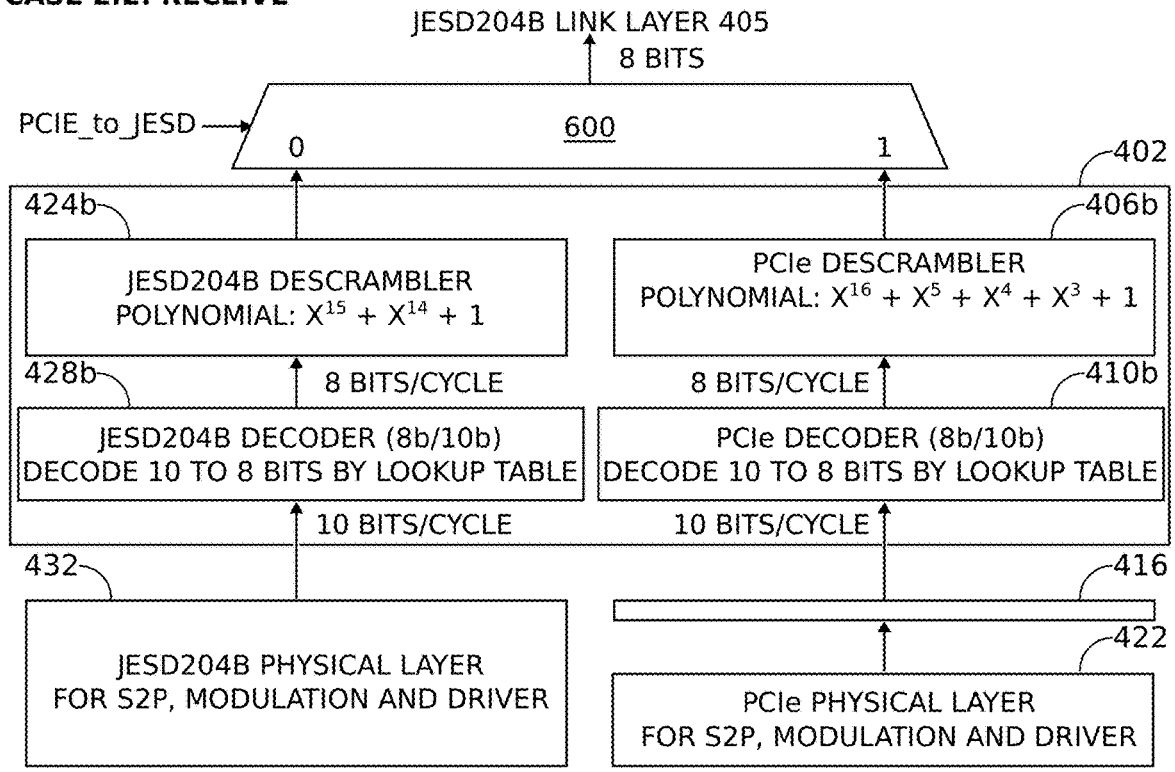

FIGS. 6A and 6B are schematic block diagrams depicting the conversion module in greater detail, with Cases 1, 1.1, and 1.2 as noted in Tables 1 and 2.

CASE 1: In FIG. 6A, CASE 1.1 depicts JESD signal transmission while CASE 1.2 depicts JESD signal reception.

CASE 1.1: FIG. 6A depicts how JESD204C data is conditioned to be received by PCIe versions 3.0, 4.0, 5.0, and 6.0. In FIG. 6A, when in the DATA STATE, 64 bits enter the conversion module 402 from the JESD204C link layer 406 every cycle. The 64 bits enter the PCIe scrambler 406a and/or JESD scrambler 424a where a polynomial is used; $X^{23}+X^{21}+X^{16}+X^8+X^5+X^2+1$ for PCIe or $X^{58}+X^{39}+1$ for JESD, followed by the 128b/130b encoded message from PCIe encoder 410a or 64b/66b encoded message from JESD encoder 428a. Therefore, every 2 cycles 130 bits enter the CDC FIFO 416, and/or every cycle 66 bits enter the JESD204C physical later 432. The CDC FIFO 416 conditions the 130 bits per 2 cycles to drive the PCIe physical layer 422. In the PCIe physical layer 422, the 130-bit parallel data is serialized in a P2S (506, see FIG. 5A), modulated, and used to drive the PCIe Interface (504, see FIG. 5A). In the JESD204C physical layer 432, the 66-bit parallel data is serialized in the P2S (520, see FIG. 5B), modulated, and used to drive a JESD204C Interface (514, see FIG. 5B).

CASE 1.2: For PCIe versions 3.0, 4.0, 5.0, and 6.0, FIG. 6A (CASE 1.2) depicts how either PCIe data from the PCIe physical layer 422 or JESD204C data from the JESD204C physical layer 432 can be used to drive the JESD204C link layer 405.

Using multiplexor 600, if PCIe_to_JESD=1, the JESD204C link layer 405 receives data from the PCIe physical layer 422. Otherwise, if PCIe_to_JESD=0, the JESD204C link layer 405 receives data from the JESD204C physical layer 432. For PCIe, serial data is received, demodulated, and converted to parallel data by the S2P (serial-to-parallel) block in the PCIe physical layer 422, which then drives the CDC FIFO 416. The 130 bits per 2 cycles output of CDC FIFO 416 is decoded in the PCIe decoder 410b, where 2 bits are removed from 130 bits to give 128 bits per 2 cycles or 64 bits every cycle. The 64 bits per cycle output of the PCIe decoder 410b is descrambled with the PCIe descrambler 406b with polynomial $X^{23}+X^{21}+X^{16}+X^8+X^5+X^2+1$ before driving the JESD204C link layer 405, if PCIe_to_JESD=1. For JESD204C, the serial data is received, demodulated, and converted to parallel data by the S2P block in the JESD204C physical layer 432. The 66 bits per cycle is decoded by the JESD204C decoder 428b, where 2 bits are removed from every 66 bits per cycle, to give 64 bits per cycle. The 64 bits per cycle output of the JESD204C decoder 428b is descrambled with the JESD204C descrambler 424b using polynomial $X^{58}+X^{39}+1$ before driving the JESD204C link layer 405, if PCIe_to_JESD=0.

CASE 2: In FIG. 6B, CASE 2.1 is for data transmission while CASE 2.2 is for data receipt.

CASE 2.1: FIG. 6B depicts how JESD204B data is conditioned to be received by PCIe versions 1.0 and 2.0. When in the DATA STATE, 8 bits enter conversion module 402 from the JESD204B link layer 405 every cycle. The 8 bits enter the PCIe scrambler 404 where the polynomial $X^{16}+X^5+X^4+X^3+1$, followed by the 8b/10b PCIe encoder 410a, Alternatively or in addition, the 8 bits enter the JESD204B scrambler 424a where the polynomial $X^{15}+X^{14}+1$ is used, followed by the 8b/10b JESD204B encoder 428a. Therefore, every cycle 10 bits enter the CDC FIFO 416 and/or the JESD204B physical layer 432. CDC FIFO 416 conditions the 10 bits per cycle to drive the PCIe physical layer 422. In the PCIe physical layer 422, the 10-bit parallel data is serialized in the P2S (parallel-to-serial) block, modulated, and used to drive the PCIe Interface. In the JESD204B physical layer 432, the 10-bit parallel data is serialized in the P2S, modulated, and used to drive the JESD204B Interface.

CASE 2.2: For PCIe versions 1.0, 2.0, FIG. 6B depicts how PCIe data from the PCIe physical layer 422 can be used to drive the JESD204B link layer 405. Alternatively or in addition, JESD204B data from the JESD204B physical layer 432 can be used to drive the JESD204B link layer 405.

If PCIe_to_JESD=1, the JESD204B link layer 405 receives data from the PCIe physical layer 422. If PCIe_to_JESD=0, the JESD204B link layer 405 receives data from the JESD physical layer 432. For PCIe, the serial data is received, demodulated, and converted to parallel data by the S2P block in the PCIe physical layer 422, which then drives CDC FIFO 416. Using a lookup table for example, the 10 bits per cycle output of CDC FIFO 416 is decoded in the PCIe decoder 410b where 2 bits are removed after 10 bits are mapped to 8 bits per cycle. The 8 bits per cycle output of the PCIe decoder 410b is descrambled with the PCIe descrambler 404b using polynomial $X^{16}+X^5+X^4+X^3+1$, before driving the JESD204B link layer 405.

If PCIe_to_JESD=0, serial data is received, demodulated, and converted to parallel data by the S2P block in the JESD204B physical layer 432. The JESD204B encoded message is decoded in the JESD204B decoder 428b, where 2 bits are removed after 10 bits are mapped to 8 bits per cycle. The 8 bits per cycle output of the JESD204B decoder 428b is descrambled with the JESD204B descrambler 424b using polynomial $X^{15}+X^{14}+1$ before driving the JESD204B link layer 405.

Figure 7A:
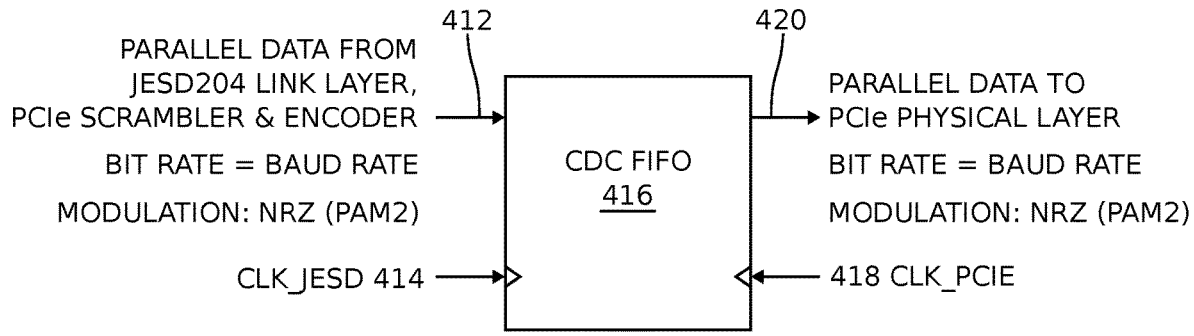
FIGS. 7A and 7B depict the CDC FIFO in greater detail, with Cases 1 and 2, as noted in Tables 1 and 2.
Figure 7A:
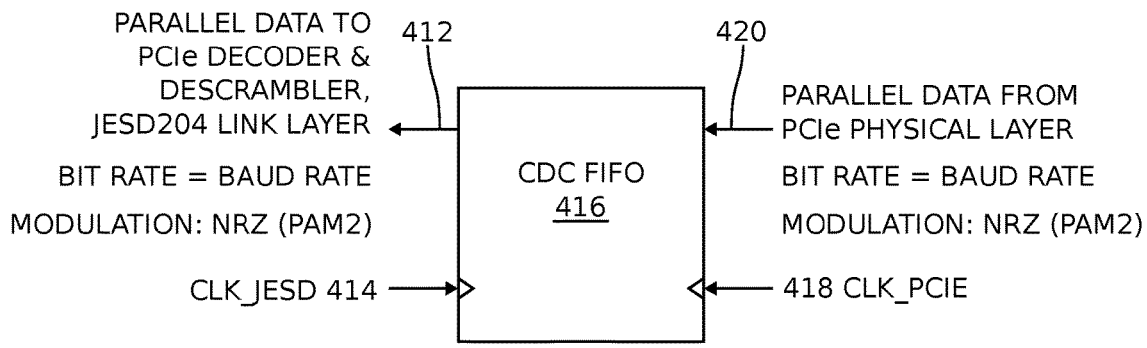
Figure 7B:
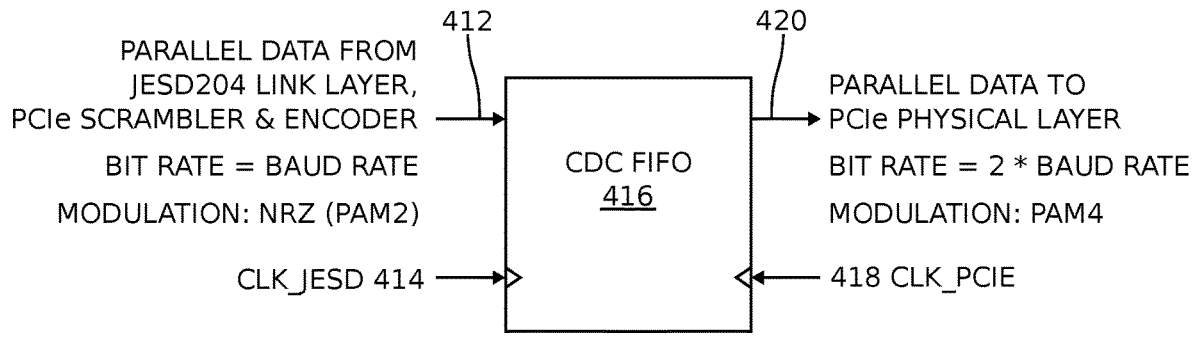
Figure 7B:
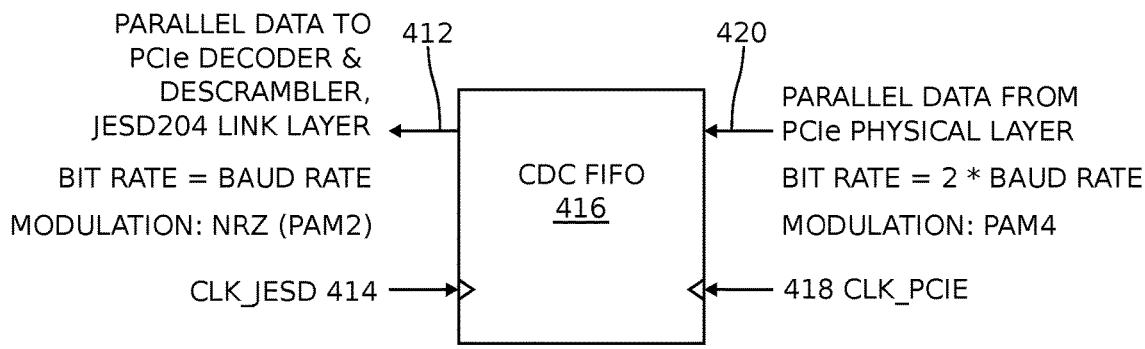

FIGS. 7A and 7B depict the CDC FIFO in greater detail, with Cases 1 and 2, as noted in Tables 1 and 2. FIG. 7A makes reference to PCIe versions 1.0 to 5.0, while FIG. 7B references PCIe 6.0. In FIG. 7A the clock-domain-crossing FIFO 416 input and output clock frequencies are the same. Even though the input and output clock frequencies for the CDC FIFO are the same, the CDC FIFO is used to soak up any instantaneous phase differences between the input and output clocks. In FIG. 7A, CASE 1 is for PCIe transmission while CASE 2 is for PCIe reception. In both cases, the CLK_JESD and CLK_PCIe clock frequencies are the same since both JESD and PCIe use the same NRZ (PAM2) for modulation.

In FIG. 7B (PCIe Version 6.0) CASE 1 is for PCIe transmission while CASE 2 is for PCIe reception.

CASE 1: The clock-domain-crossing (CDC) FIFO 416 output clock (CLK_PCIe) frequency on line 418 is half the frequency of the input clock (CLK_JESD) on line 414. This is because CLK_JESD is used to put data into the CDC FIFO at half the data rate that the output data is extracted. For every 1 bit/cycle that data is input into the FIFO with CLK_JESD, CLK_PCIe is used to extract data from the CDC FIFO at 2 bits/cycle. Maintaining the 2:1 ratio of the input and output clock frequencies guarantees that the CDC FIFO never underflows.

When in DATA STATE, CDC FIFO 416 receives parallel data that has traveled from the JESD link layer via the PCIe scrambler and encoder. The output of the CDC FIFO 416 is parallel data that is used to drive the PCIe physical layer. The JESD physical layer uses NRZ (PAM2) modulation (1 bit/cycle). Therefore, the bit rate=baud rate on the input side of the FIFO 416. On the output side of the FIFO 416, the bit rate=twice the baud rate since the PCIe physical layer uses PAM4 modulation. Therefore, to prevent FIFO underflow, the frequency of the FIFO output clock (CLK_PCIe) on line 418 is half the frequency of the FIFO input clock (CLK_JESD) on line 414.

Figure 8A:
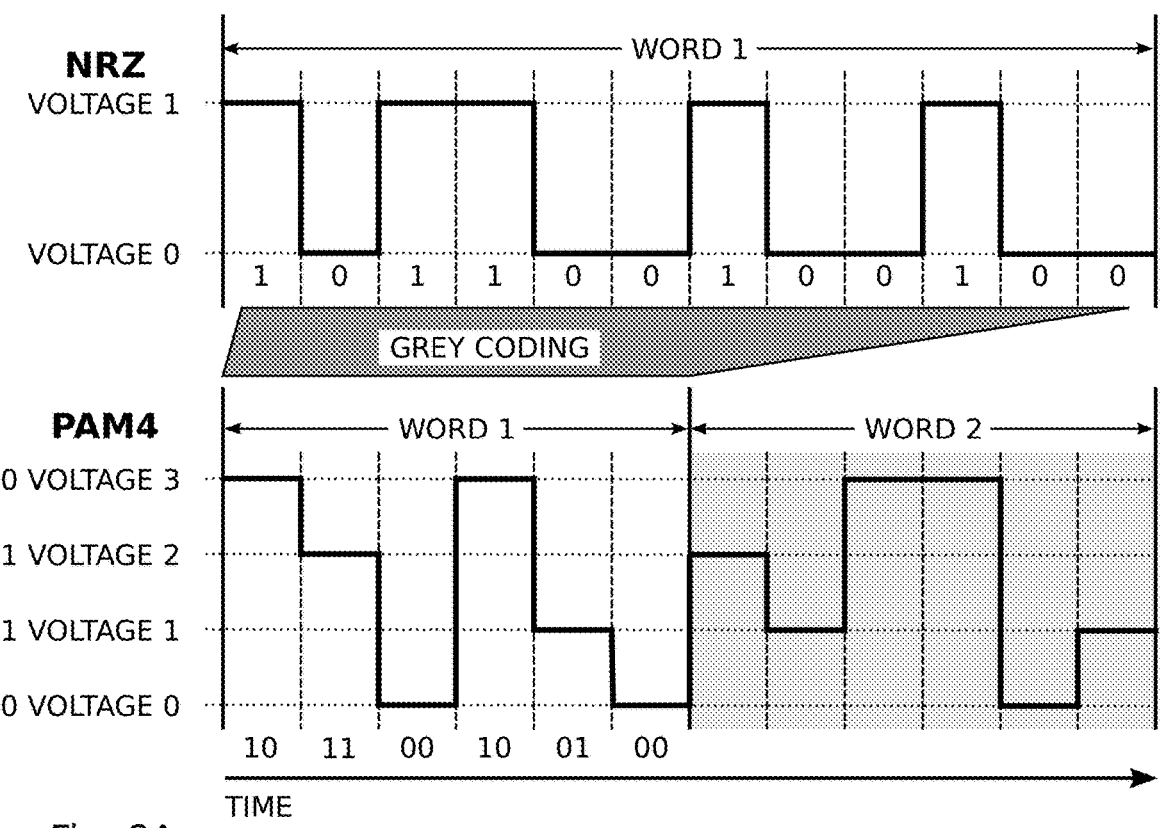
FIGS. 8A and 8B are timing diagrams comparing NRZ and PAM4 encoding.
Figure 8B:
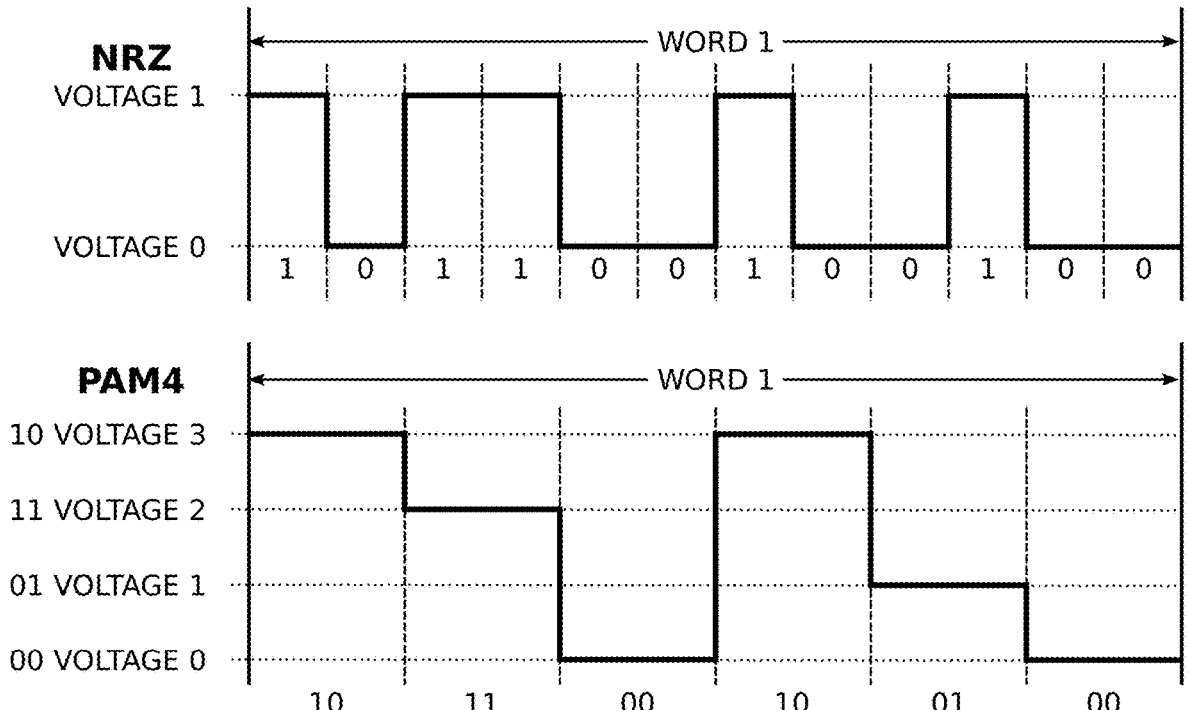

FIGS. 8A and 8B are timing diagrams comparing NRZ and PAM4 encoding. If the same frequency is used for both CLK_PCIe and CLK_JESD as shown in FIG. 8A, then the Word 1 durations for PCIe and JESD mismatch due to NRZ-PAM4 mismatch, thereby leading to FIFO underflow. In other words, the CDC FIFO underflows because for every word put into the CDC FIFO at the frequency of CLK_JESD, 2 words are removed from the FIFO at the frequency of CLK_PCIe. On the other hand, FIG. 8B illustrates that the Word 1 durations for PCIe and JESD match when the CLK_PCIe frequency is half the CLK_JESD frequency; hence, FIFO underflow is avoided.

CASE 2: The data direction is flipped when moving from PCIe transmission to PCIe reception. Again, the CDC FIFO input clock (CLK_PCIe) frequency on line 418 is half the frequency of the output clock (CLK_JESD) on line 414. This is because CLK_PCIe is used to put data into the CDC FIFO at the rate of 2 bits/cycle, while CLK_JESD is used to extract data from the CDC FIFO at the rate of 1 bit/cycle. Maintaining the 1:2 ratio of the input and output clock frequencies guarantees that the CDC FIFO never overflows.

When in DATA STATE, CDC FIFO 416 receives parallel data from the PCIe physical layer that travels to the JESD link layer via the PCIe decoder and descrambler. As noted above, the PCIe physical layer uses PAM4 modulation to put data at the rate of 2 bits/cycle into the FIFO. Therefore, the bit rate=twice the baud rate on the input side of the FIFO. On the other hand, on the output side of the FIFO, the bit rate=baud rate since the JESD physical layer uses NRZ (PAM2) modulation to receive at the rate of 1 bit/cycle. Therefore, to prevent FIFO overflow, the frequency of the FIFO input clock (CLK_PCIe) on line 418 is half the frequency of the FIFO output clock (CLK_JESD) on line 414.

A scrambler is a device that randomizes the data before transmitting. A descrambler does the inverse—at the receiver, it reverses all the manipulations done by the scrambler at the transmitter. The scrambler converts an input string into a seemingly random output string. The randomization of the input string prevents long sequences of bits of the same value. The randomization process of the scrambler eliminates long sequences of "1" or "0" only. Eliminating long sequences of "1" or "0" only means the receiver sees many transitions of "0" to "1", and many transitions from "1" to "0".

Scrambling is especially useful in clock recovery. Clock recovery is the process of extracting timing information from a serial data stream itself, allowing the timing of the data in the stream to be accurately determined without separate clock information. The clock recovery circuit uses the transitions in the incoming data stream to determine the timing frequency of the data. Since clock recovery is based on the transitions in the received data, more transitions in the data leads to more accurate clock recovery. Therefore, the scrambler enables more accurate timing recovery in the receiver because the scrambler eliminates long sequences of "0" or "1" only.

Scrambling also reduces inter-carrier signal interference. When the same data repeats again and again, there is a pronounced power associated with the frequency of the repetition of that data. Therefore, the receiver will see spectral peaks corresponding to a narrow frequency band, where the power is concentrated. Due to unavoidable non-linearity in the receiver, power concentration in a narrow frequency band (due to repeated data) leads to interference with adjacent channels via inter-modulation. Therefore, it is imperative that the energy is dispersed and spread across frequencies in order to reduce inter-carrier signal interference. The scrambler, by randomizing the data, spreads the power spectrum across all frequencies, thereby reducing the inter-carrier signal interference by eliminating the dependence of a signal's power on the transmitted data. Scrambling the data means that no particular frequency is sent for any significant amount of time, thereby spreading the signal power over a range of frequencies. Therefore, scrambling effectively "whitens" the frequency content of the signal, making it appear more like random noise, which has a broadband spectrum and prevents any particular frequency component from having a higher power than any other frequency component.

In addition, scrambling reduces electromagnetic interference (EMI) and radio frequency interference (RFI). EMI is a disturbance generated by an external source that affects an electrical circuit by electromagnetic induction, electrostatic coupling, or conduction. When in the radio frequency spectrum, EMI is called RFI. Scrambling randomizes the data in order to spread the spectral content to reduce spectral peaks that could cause EMI or RFI interference problems.

Further, scrambling helps to DC-balance a transmitted signal. If there is a long string of "1" in the transmitted data, then the DC level of the transmitted data will be close to VDD (voltage for "1"). Conversely, if there is a long string of "0" in the transmitted data, then the DC level of the transmitted data will be close to GND (voltage for "0"). Therefore, the scrambler randomizes the data to break up long sequences of "1" or "0", and create transitions so that the DC-balance is at the desired VDD/2 (half-way between VDD and GND).

The scramblers for JESD204 and PCIe use linear-feedback shift registers (LFSRs). The only difference between the LFSR used for the JESD204 scrambler and the LFSR used for the PCIe scrambler is the points where the LFSRs are tapped before they are combined to produce the scrambler outputs. The scrambler polynomial represents the scrambler LFSR.

Figure 9A:
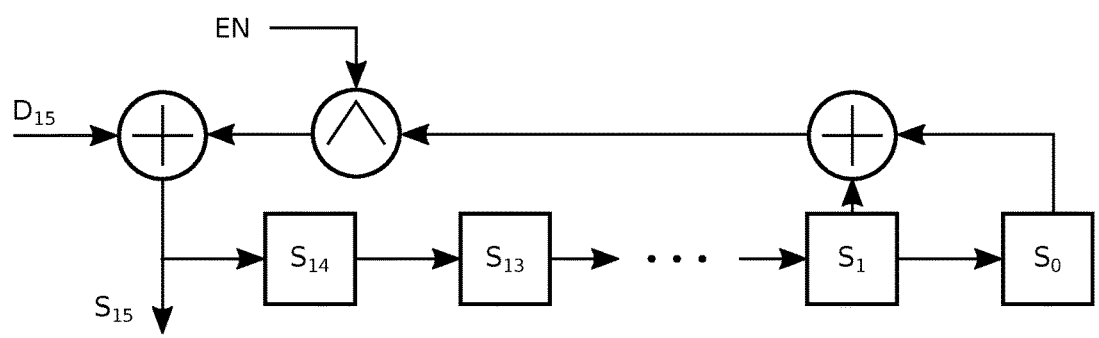
FIGS. 9A and 9B are depictions, respectively, of an exemplary LFSR scrambler and descrambler.
Figure 9B:
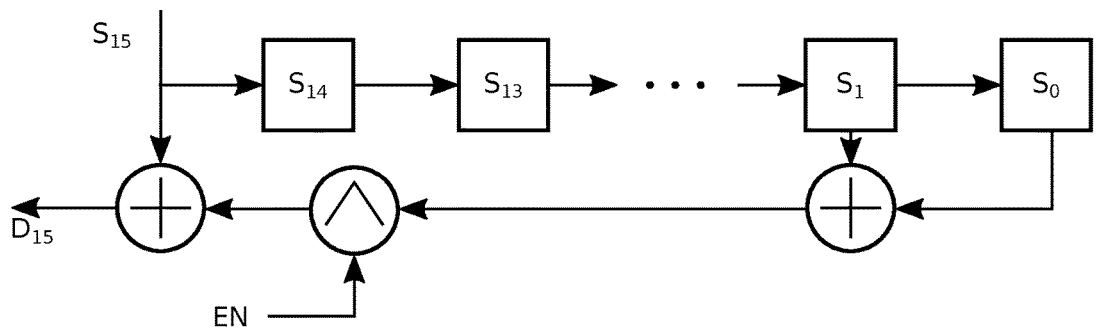

FIGS. 9A and 9B are depictions, respectively, of an exemplary LFSR scrambler and descrambler. In FIG. 9A, if the scrambler polynomial is $1+X^{14}+X^{15}$ (e.g. JESD204B), the data is shifted into the LFSR most significant bit (MSB) first. When EN=1 the scrambler is enabled. "·" represents an AND gate and "+" stands for XOR. Therefore, $1+X^{14}+X^{15}$ means that the scrambler output, S15=D15 (represented by 1 in the polynomial) is XORed with S1 (the bit that was shifted in 14 cycles ago—represented by $X^{14}$ in the polynomial), and XORed with S0 (the bit that was shifted in 15 cycles ago—represented by $X^{15}$ in the polynomial).

The descrambler block diagram (FIG. 9B) is just the inverse of the scrambler block diagram.

TABLE 3

| Encoding For JESD204 and PCIe | | |
| --- | --- | --- |
| | JESD204 | PCIe |
| 8b/10b ENCODING | 204B & 204C | PCIe 1.0, PCIe 2.0 |
| 64/66B ENCODING | 204C | |
| 128b/130b ENCODING | | PCIe 3.0, PCIe 4.0, PCIe 5.0, PCIe 6.0 |

As noted in Table 3, JESD204B/C and PCIe 1.0/2.0 use 8B/10B encoding. 8B/10B encoding maps 8-bit words to 10-bit symbols according to the JESD204B/PCIe table. For example, the 8-bit word, 0b101 11100 (0xBC) is mapped to the 10-bit symbol, 0b001111 1010. The mapping is done in such a way that the difference between the counts of "1"s and "0"s in a string of 20 bits is not more than 2. This means the difference between the counts of "1"s and "0"s in a 10-bit symbol is not more than 1. Thus, there are not more than 5 "1"s or 5 "0"s in a row.

If an 8-bit word is repeated in the transmitted string, the first word is mapped to a certain 10-bit symbol (according to the table), but the second word is mapped to the inverse of the first 10-bit symbol. Mapping the second word to the inverse of the first 10-bit symbol is done in order to satisfy the requirements that there is no more than a difference of 2 in the counts of "1"s or "0"s in 20 bits and no more than 5 "1"s or "0"s in a row.

Control symbols are 10-bit symbols that are valid sequences of bits (no more than 6 "1"s or "0"s) but do not have a corresponding 8-bit data word. Control symbols are used for low-level control functions like synchronization, and alignment, etc.

Both JESD204 and PCIe transmit data serially through differential wire pairs. If the transmitted data is un-encoded, there can be no assurance of a DC-balanced signal on a differential channel with random serial data, since there easily could be a long string of either "1"s or "0"s. This is because random data that is sent across a serial link has the potential to have long periods of inactivity or strings of data that could easily be all "1"s or all "0"s for a relatively long time. When a long string of "1"s or "0"s of un-encoded data is sent, the DC-balance of an un-encoded serial data stream becomes railed to one extreme (e.g. VDD) or the other (e.g. GND). After this happens, when active data starts being sent again, there is a strong potential of bit errors as the biasing of the lines is re-started. Electromigration is an additional long-term concern when the DC-balance is not mid-rail (VDD/2).

8B/10B encoding guarantees that the DC-balance is mid-rail. The requirements that there is no more than a difference of 2 in the counts of "1"s or "0"s in 20 bits and no more than 5 "1"s or "0"s in a row ensures that there are enough transitions to ensure the DC balance is close to VDD/2 (midway between VDD and GND), instead of being close to VDD (because of too many "1"s in a row) or being close to GND (because of too many "0"s in a row).

As noted above, clock recovery is the process of extracting timing information from a serial data stream itself, allowing the timing of the data in the stream to be accurately determined without separate clock information. The clock recovery circuit uses the transitions in the incoming data stream to determine the timing frequency of the data. Since clock recovery is based on the transitions in the received data, more transitions in the data leads to more accurate clock recovery. The requirements that there is no more than a difference of 2 in the counts of "1"s or "0"s in 20 bits and no more than 5 "1"s or "0"s in a row ensures that there is enough "1" to "0" and "0" to "1" transitions to allow reasonable clock recovery at the receiver.

8b/10b coding aims for DC-balance=VDD/2. This means that, in the long term, the ratio of the transmitted "1"s and the transmitted "0"s is 50%. The difference between the number of transmitted "1"s and the number of transmitted "0"s is called the running disparity (RD). To achieve the objective of a DC-free transmission (i.e. DC-balance=VDD/2), the running disparity at the end of each 10-bit symbol is +1 or −1 and the running disparity at the end of each 20 bits is +/−2. Since any 8-bit word can be mapped to a 10-bit symbol or its inverse, the encoding engine uses the current running disparity to select which of the 2 possible 10-bit symbols to map the 8-bit word to, in order to achieve DC-free transmission.

The converse decoding of the 10 bits to 8 bits is performed on the received data stream to recover the original data by using a reverse lookup table. At the receiver, the decoded word is the 8-bit word that corresponds to the received 10-bit symbol in the lookup table.

An 8-bit word has $2^8=256$ possibilities that can be mapped to a maximum of 512 10-bit words (256 10-bit words and 256 inverse of 10-bit words) out of a total of $1024=2^{10}$ possibilities of 10-bit symbols. Because 8b/10b encoding uses 10-bit symbols to encode 8-bit words, some of the possible 1024 symbols can be excluded in order to grant a run length limit of 5 consecutive equal bits and to ensure that the difference between the count of "0"s and "1"s in any 20-bit string is not more than 2. The 8-bit to 10-bit encoding scheme uses only 512 of the possible 1024 output values. Of the remaining 512 unused output values, most are disallowed because they contain either too many "1"s (or too many "0"s). After removing the disallowed symbols, there is still enough room for 10-bit odd/even coding pairs for at least 12 special non-data control symbols. At the receiver, any 10-bit symbol that is not in the 8b/10b encoding lookup table indicates an error in transmission. It should be noted that 8b/10b is the encoding scheme, and not a particular specific code. This means different standards may have different lookup tables for the 8 bit-to-10 bit mapping.

In 8B/10B encoding, overhead necessarily exists since 10 bits are used to send the original 8 bits of information. This translates to 25% inefficiency overhead since 10/8=1.25. 64b/66b encoding is a lower-overhead alternative to 8b/10b encoding since it has only a 2-bit (instead of a 16-bit) overhead per 64 bits of encoded data. The 3.125% (66/64=1.03125) inefficiency overhead of 64b/66b is much lower than the 25% inefficiency overhead of 8B/10B.

FIGS. 10A and 10B are drawings depicting exemplary 66b words with SYNC HEADERs. As noted in Table 3, JESD204C uses 64b/66b encoding, which maps a 64-bit word to a 66-bit word. The 66-bit word is formed by prefixing the 64-bit word with a 2-bit SYNC_HEADER (FIG. 10A). If the SYNC_HEADER is "01", the 64-bit payload is data. If the SYNC_HEADER is "10", the 64-bit payload contains an 8-bit TYPE field and 56-bits of control information and/or data. SYNC_HEADERs of "00" and "11" are invalid and indicate an error if seen. A SYNC_HEADER is used to facilitate alignment to data vectors on the receiving side and synchronization to the received bit stream. The use of "01" and "10" SYNC_HEADERs guarantees a bit transition occurs every 66 bits. This means that a continuous stream of 66 "1"s or 66 "0"s cannot be valid data. This also allows easier clock and timer synchronization, since a transition must occur every 66 bits. Before transmission, the 64-bit payload data (not the SYNC_HEADER) is scrambled.

Most 64b/66b clock recovery circuits are specified to tolerate an 80-bit run length. An 80-bit run cannot occur in 64b/66b because transitions are guaranteed at 66-bit intervals. The scrambling of the 64-bit payload data ensures a relatively even distribution of "1"s and "0"s in the transmitted data. The scrambler cannot guarantee that output data will never have a long run-length of all "0"s or all "1"s, but it imposes strong statistical bounds on the probability of such events. At 10 Gigabits per second, the expected event rate of a 66-bit block with a 65-bit run-length, assuming random data is once every 1900 years!

Unlike 8b/10b, 64b/66b does not explicitly guarantee DC-balance and the DC-balance is not absolutely bounded. Rather, via the scrambling, 64B/66B can statistically achieve DC balance. At the receiver, the 64-bit payload data is recovered after the 2-bit SYNC_HEADER is stripped off.

Comparing 8b/10b to 66b/66b, 8b/10b encoding has deterministic run length and transition density, at the expense of 25% code overhead. The main idea behind the 64b/66b coding approach (instead of the 8b/10b codebook approach) is that the explicitly guaranteed DC-balance, run length, and transition density of 8b/10b are not always worth the 25% code overhead of 8b/10b encoding. In other words, solid robust systems can be designed using statistically bounded methods like the 64b/66b method, instead of using the 8b/10b codebook method. At some point practical risks, whether from MTBF (mean time between failures) of components (e.g. power supplies) or from phenomena such as cosmic rays or solar flares, dominate the reliability of both 8b/10b and 64b/66b systems.

As noted in Table 3, PCIe 3.0, 4.0, 5.0, and 6.0 use 128b/130b encoding. 128b/130b encoding is an extension of 64b/66b encoding, in that it maps a 128-bit word to a 130-bit word. In other words, it has a 128-bit payload instead of a 64-bit payload. 128b/130b uses a different scrambling polynomial than 64b/66b. The 128b/130b scrambler is not self-synchronous like the 64b/66b scrambler, in that it requires explicit synchronization of the scrambler seed values. At the receiver, the 128-bit payload data is recovered after the 2-bit SYNC_HEADER is stripped off.

Figure 11:
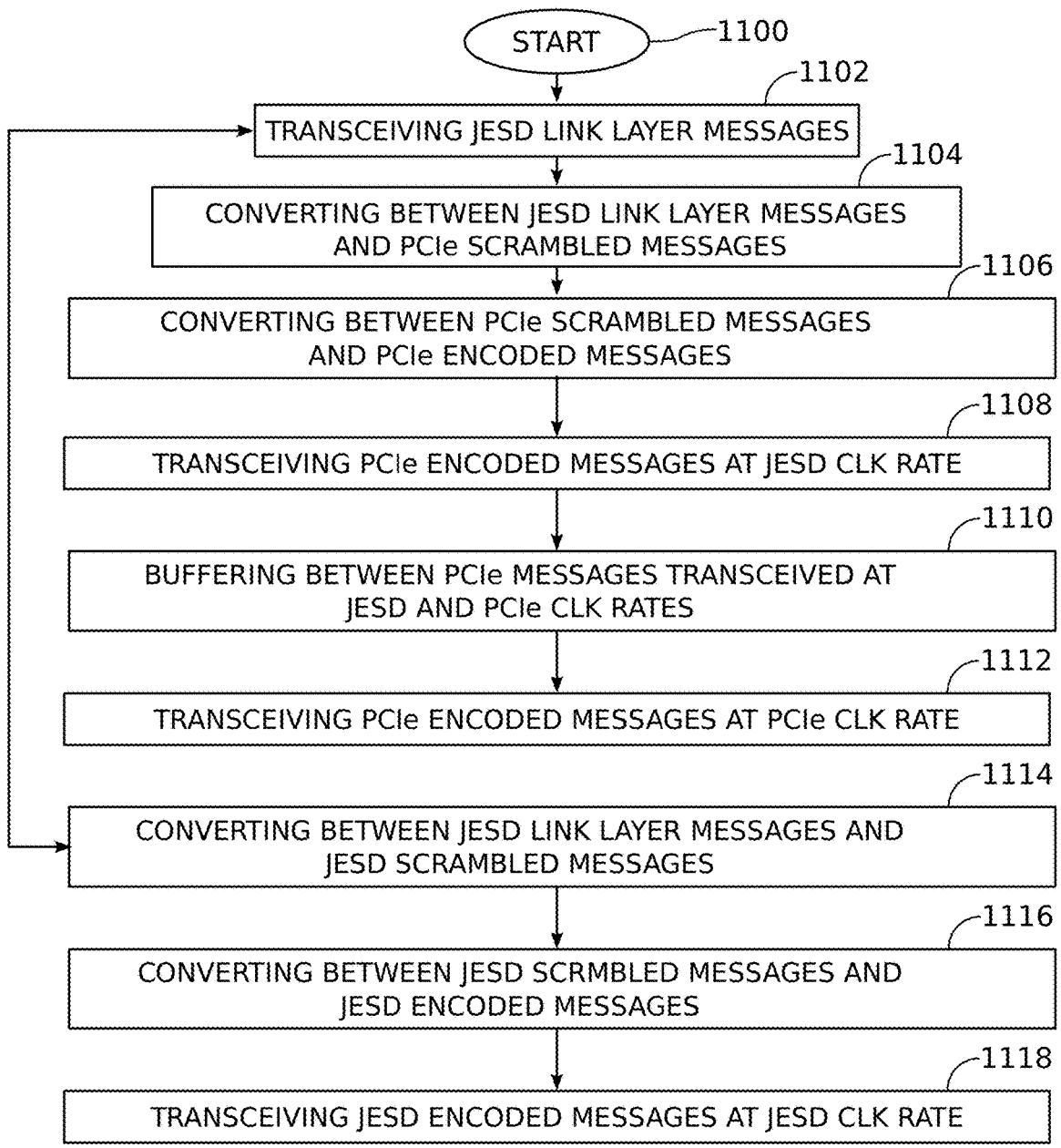
FIG. 11 is a flowchart illustrating a method for interfacing JESD204-to-PCIe communications.

FIG. 11 is a flowchart illustrating a method for interfacing JESD204-to-PCIe communications. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 transceives JESD204 link layer messages with a JESD204 link layer. Step 1104 converts between JESD204 link layer messages and PCIe scrambled messages. Step 1106 converts between PCIe scrambled messages and PCIe encoded messages. Step 1108 transceives PCIe encoded messages at a JESD clock rate. Step 1110 buffers between PCIe encoded messages transceived at the JESD clock rate and PCIe encoded messages transceived at a PCIe clock rate. Step 1112 transceives PCIe encoded messages at the PCIe clock rate with a PCIe physical layer. Depending of the signal path direction (JESD signal transmission or reception), the steps may be alternatively understood to flow from Step 1112 to Step 1102.

In one aspect, converting between JESD204 link layer messages and PCIe scrambled messages in Step 1104 includes converting between 64b JESD204C link layer messages and version 3.0, 4.0, 5.0, or 6.0 PCIe scrambled messages, using the following polynomial:

$$X^{23}+X^{21}+X^{16}+X^{8}+X^{5}+X^{2}+1.$$

Then, transceiving PCIe encoded messages at a JESD clock rate in Step 1108 includes transceiving 128b/130b PCIe encoded messages. In the case of version 3.0, 4.0, or 5.0 PCIe, buffering between PCIe encoded messages transceived at the JESD clock rate and PCIe encoded messages transceived at a PCIe clock rate in Step 1110 includes using a JESD clock signal having a first clock rate and a PCIe clock signal having the first clock rate. Alternatively, for PCIe version 6.0, Step 1110 buffers between PCIe encoded messages transceived at the JESD clock rate having a first clock rate and a PCIe clock signal having a second clock rate equal to a second clock bit rate and equal to half the first clock rate. Then, transceiving PCIe encoded messages at the PCIe clock rate with a PCIe physical layer in Step 1112 includes transceiving PCIe encoded messages at a baud rate equal to half the second clock bit rate.

In a different aspect, converting between JESD204 link layer messages and PCIe scrambled messages in Step 1104 includes converting between 8b JESD204B link layer messages and version 1.0 or 2.0 PCIe scrambled messages using the following polynomial:

$$X^{16}+X^{5}+X^{4}+X^{3}+1.$$

Then, transceiving PCIe encoded messages at a JESD clock rate in step 1108 includes transceiving 8b/10b PCIe encoded messages. In this aspect, buffering between PCIe encoded messages transceived at the JESD clock rate and PCIe encoded messages transceived at a PCIe clock rate in Step 1110 includes using a JESD clock signal having a first clock rate and a PCIe clock signal having the first clock rate.

In a different aspect, Step 1114 converts between JESD204 link layer messages and JESD scrambled messages. Step 1116 converts between JESD scrambled messages and JESD encoded messages, and Step 1118 transceives JESD encoded messages at the JESD clock rate, with a JESD physical layer. Again, depending on the direction of the signal path, these steps may be alternatively understood to flow from Step 1118 to Step 1114.

In one variation, converting between JESD204 link layer messages and JESD scrambled messages in Step 1114 includes converting between 64b JESD204C link layer messages and JESD scrambled messages using the following polynomial:

$$X^{58}+X^{39}+1.$$

Then, transceiving JESD encoded messages at the JESD clock rate, with a JESD physical layer in Step 1118, includes transceiving 66b JESD204C encoded messages.

Alternatively, converting between JESD204 link layer messages and JESD scrambled messages in Step 1114 may include converting between 8b JESD204B link layer messages and JESD scrambled messages using the following polynomial:

$$X^{15}+X^{14}+1.$$

Then, transceiving JESD encoded messages at the JESD clock rate, with a JESD physical layer in Step 1118, includes transceiving 10b JESD204B encoded messages.

A system and method have been provided for efficiently converting between JESD204 and PCIe serial communication formats. Examples of particular message structures and hardware block diagrams have been presented to illustrate the invention. However, the invention is not limited to merely these examples. Other variations and embodiments of the invention will occur to those skilled in the art.

We claim:

1. A Joint Electron Devices Engineering Council (JESD) 204-to-Peripheral Component Interconnect Express (PCIe) interface system, the system comprising:
a conversion module comprising;
a link layer interface to transceive JESD204 link layer messages with a JESD204 link layer;
a PCIe scrambling module to convert between JESD204 link layer messages and PCIe scrambled messages;
a PCIe coding module to convert between PCIe scrambled messages and PCIe encoded messages;
a clock-domain-crossing (CDC) interface to transceive PCIe encoded messages at a JESD clock rate;
a JESD clock output interface to supply a JESD clock signal;
a CDC first-in first out memory comprising:
a JESD clock input to accept the JESD clock signal;
a PCIe clock input to accept a PCIe clock signal having a PCIe clock rate;
the CDC interface to transceive PCIe encoded messages with the PCIe coding module; and,
a PCIe physical layer interface to transceive PCIe encoded messages at the PCIe clock rate with a PCIe physical layer.

2. The system of claim 1 wherein the PCIe scrambling module converts between 64 bit (b) JESD204C link layer messages and PCIe scrambled messages selected from q PCIe group consisting of versions 3.0, 4.0, 5.0, and 6.0; and,
wherein the conversion module CDC interface transceives 128b/130b PCIe encoded messages.

3. The system of claim 2 wherein the PCIe scrambling module converts between JESD204C link layer messages and PCIe scrambled messages using a linear-feedback shift register (LFSR) and the following polynomial:

$$X^{23}+X^{21}+X^{16}+X^{8}+X^{5}+X^{2}+1;$$

where "X" represents a bit shift position.

4. The system of claim 3 wherein the conversion module CDC interface transceives PCIe encoded messages selected from the PCIe group consisting of versions 3.0, 4.0, and 5.0;
wherein the JESD clock signal has a first clock rate; and,
wherein the PCIe clock signal has the first clock rate.

5. The system of claim 3 wherein the conversion module CDC interface transceives PCIe 6.0 encoded messages
wherein the JESD clock signal has a first clock rate;
wherein the PCIe clock signal has a second clock rate equal to a second clock bit rate and equal to half the first clock rate; and,
wherein the PCIe physical layer interface transceives PCIe encoded messages at a baud rate equal to half the second clock bit rate.

6. The system of claim 1 wherein the PCIe scrambling module converts between 8b JESD204B link layer messages and PCIe scrambled messages selected from the PCIe group consisting of versions 1.0 and 2.0; and,
wherein the conversion module CDC interface transceives 8b/10b PCIe encoded messages.

7. The system of claim 6 wherein the PCIe scrambling module converts between JESD204B link layer messages and PCIe scrambled messages using a LFSR and the following polynomial:

$$X^{16}+X^{5}+X^{4}+X^{3}+1;$$

where "X" represents a bit shift position.

8. The system of claim 6 wherein the JESD clock signal has a first clock rate; and,
wherein the PCIe clock signal has the first clock rate.

9. The system of claim 1 wherein the conversion module further comprises;
a JESD scrambling module to convert between JESD204 link layer messages and JESD scrambled messages;
a JESD coding module to convert between JESD scrambled messages and JESD encoded messages; and,
a JESD physical layer interface to transceive the JESD encoded messages at the JESD clock rate, with a JESD physical layer.

10. The system of claim 9 wherein the JESD scrambling module converts between 64b JESD204C link layer messages and JESD scrambled messages; and,
wherein the conversion module JESD physical layer interface transceives 66b JESD204C encoded messages.

11. The system of claim 10 wherein the JESD scrambling module converts between 64b JESD204C link layer messages and JESD scrambled messages using a LFSR and the following polynomial:

$$X^{58}+X^{39}+1;$$

where "X" represents a bit shift position.

12. The system of claim 9 wherein the JESD scrambling module converts between 8b JESD204B link layer messages and JESD scrambled messages; and,
wherein the conversion module JESD physical layer interface transceives 10b JESD204B encoded messages.

13. The system of claim 12 wherein the JESD scrambling module converts between 8b JESD204B link layer messages and JESD scrambled messages using a LFSR and the following polynomial:

$$X^{15}+X^{14}+1;$$

where "X" is a bit shift position.

14. A method for interfacing Joint Electron Devices Engineering Council (JESD)204-to-Peripheral Component Interconnect Express (PCIe) communications, the method comprising:
transceiving JESD204 link layer messages with a JESD204 link layer;
converting between JESD204 link layer messages and PCIe scrambled messages;
converting between PCIe scrambled messages and PCIe encoded messages;
transceiving PCIe encoded messages at a JESD clock rate;
buffering between PCIe encoded messages transceived at the JESD clock rate and PCIe encoded messages transceived at a PCIe clock rate; and,
transceiving PCIe encoded messages at the PCIe clock rate with a PCIe physical layer.

15. The method of claim 14 wherein converting between JESD204 link layer messages and PCIe scrambled messages includes converting between 64 bit (b) JESD204C link layer messages and PCIe scrambled messages selected from q PCIe group consisting of versions 3.0, 4.0, 5.0, and 6.0; and,
wherein transceiving PCIe encoded messages at a JESD clock rate includes transceiving 128b/130b PCIe encoded messages.

16. The method of claim 15 converting between JESD204C link layer messages and PCIe scrambled messages includes converting between JESD204C link layer messages and PCIe scrambled messages using a linear-feedback shift register (LFSR) and the following polynomial:

$$X^{23}+X^{21}+X^{16}+X^{8}+X^{5}+X^{2}+1;$$

where "X" is a bit shift position.

17. The method of claim 16 wherein transceiving PCIe encoded messages at a JESD clock rate includes transceiving PCIe encoded messages selected from the PCIe group consisting of versions 3.0, 4.0, and 5.0; and,
wherein buffering between PCIe encoded messages transceived at the JESD clock rate and PCIe encoded messages transceived at a PCIe clock rate includes using a JESD clock signal having a first clock rate and a PCIe clock signal having the first clock rate.

18. The method of claim 16 wherein transceiving PCIe encoded messages at a JESD clock rate includes transceiving PCIe 6.0 encoded messages;
wherein buffering between PCIe encoded messages transceived at the JESD clock rate and PCIe encoded messages transceived at a PCIe clock rate includes using a JESD clock signal having a first clock rate and a PCIe clock signal having a second clock rate equal to a second clock bit rate and equal to half the first clock rate; and,
wherein transceiving PCIe encoded messages at the PCIe clock rate with a PCIe physical layer includes transceiving PCIe encoded messages at a baud rate equal to half the second clock bit rate.

19. The method of claim 14 wherein converting between JESD204 link layer messages and PCIe scrambled messages includes converting between 8b JESD204B link layer messages and PCIe scrambled messages selected from the PCIe group consisting of versions 1.0 and 2.0; and,
wherein transceiving PCIe encoded messages at a JESD clock rate includes transceiving 8b/10b PCIe encoded messages.

20. The method of claim 19 converting between JESD204B link layer messages and PCIe scrambled messages includes converting between JESD204 link layer messages and PCIe scrambled messages using a LFSR and the following polynomial:

$$X^{16}+X^{5}+X^{4}+X^{3}+1;$$

where "X" is a bit shift position.

21. The method of claim 19 wherein buffering between PCIe encoded messages transceived at the JESD clock rate and PCIe encoded messages transceived at a PCIe clock rate includes using a JESD clock signal having a first clock rate and a PCIe clock signal having the first clock rate.

22. The method of claim 14 further comprising;
converting between JESD204 link layer messages and JESD scrambled messages;
converting between JESD scrambled messages and JESD encoded messages; and,
transceiving JESD encoded messages at the JESD clock rate, with a JESD physical layer.

23. The method of claim 22 wherein converting between JESD204 link layer messages and JESD scrambled messages includes converting between 64b JESD204C link layer messages and JESD scrambled messages; and,
wherein transceiving JESD encoded messages at the JESD clock rate, with a JESD physical layer, includes transceiving 66b JESD204C encoded messages.

24. The method of claim 23 wherein converting between 64b JESD204C link layer messages and JESD scrambled messages includes converting between 64b JESD204C link layer messages and JESD scrambled messages using a LFSR and the following polynomial:

$$X^{58}+X^{39}+1;$$

where "X" is a bit shift position.

25. The method of claim 22 wherein converting between JESD204 link layer messages and JESD scrambled messages includes converting between 8b JESD204B link layer messages and JESD scrambled messages; and,
wherein transceiving JESD encoded messages at the JESD clock rate, with a JESD physical layer, includes transceiving 10b JESD204B encoded messages.

26. The method of claim 25 wherein converting between 8b JESD204B link layer messages and JESD scrambled messages includes converting between 8b JESD204B link layer messages and JESD scrambled messages using a LFSR and the following polynomial:

$$X^{15}+X^{14}+1;$$

where "X" is a bit shift position.

* * * * *

UNITED STATES PATENT AND TRADEMARK OFFICE
CERTIFICATE OF CORRECTION

PATENT NO. : 11,663,157 B1
APPLICATION NO. : 18/086773
DATED : May 30, 2023
INVENTOR(S) : Uvieghara and Kappes It is certified that error appears in the above-identified patent and that said Letters Patent is hereby corrected as shown below:

In the Claims

In Claim 2 (Column 17, Line 30) and 15 (Column 18, Line 60), the letter --q-- should read "a".

Signed and Sealed this
Twenty-seventh Day of June, 2023

Katherine Kelly Vidal
*Director of the United States Patent and Trademark Office*